(12) United States Patent
Shipman et al.

(10) Patent No.: US 12,420,890 B2
(45) Date of Patent: *Sep. 23, 2025

(54) BICYCLE DERAILLEUR

(71) Applicant: SRAM, LLC, Chicago, IL (US)

(72) Inventors: Christopher Shipman, Chicago, IL (US); Sage Hahn, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/326,454

(22) Filed: May 31, 2023

(65) Prior Publication Data

US 2023/0312054 A1 Oct. 5, 2023

Related U.S. Application Data

(63) Continuation of application No. 17/314,949, filed on May 7, 2021, now Pat. No. 11,713,095.

(51) Int. Cl.
   *B62M 9/121* (2010.01)
   *B62M 9/122* (2010.01)
   *B62M 9/124* (2010.01)
   *B62M 9/1242* (2010.01)
   *B62M 9/126* (2010.01)

(52) U.S. Cl.
   CPC ............ *B62M 9/121* (2013.01); *B62M 9/124* (2013.01); *B62M 9/1242* (2013.01); *B62M 9/122* (2013.01); *B62M 2009/12406* (2013.01); *B62M 9/126* (2013.01)

(58) Field of Classification Search
   CPC .. B62M 9/1242; B62M 9/1248; B62M 9/126; B62M 9/121; B62M 9/122; B62M 9/124; B62M 2009/12406; B62M 25/08

USPC ....................................................... 474/80, 82
See application file for complete search history.

(56) References Cited

U.S. PATENT DOCUMENTS

| | | | | |
|---|---|---|---|---|
| 3,919,891 A * | 11/1975 | Stuhlmuller | ........... | B62M 9/122 474/81 |
| 4,946,425 A * | 8/1990 | Buhlmann | ............. | B62M 9/122 280/238 |
| 5,470,277 A * | 11/1995 | Romano | ................ | B62M 25/08 474/81 |
| 5,480,356 A * | 1/1996 | Campagnolo | .......... | B62M 9/122 280/238 |
| 5,494,307 A * | 2/1996 | Anderson | ............. | B62M 9/122 280/236 |
| 6,162,140 A * | 12/2000 | Fukuda | .................. | B62M 25/08 474/81 |
| 7,290,458 B2 * | 11/2007 | Fukuda | .................. | B62M 25/08 74/82 |

(Continued)

FOREIGN PATENT DOCUMENTS

| | | |
|---|---|---|
| DE | 4109006 A1 | 9/1992 |
| DE | 202015003858 U1 | 6/2015 |

(Continued)

*Primary Examiner* — Anna M Momper
*Assistant Examiner* — Raveen J Dias

(57) ABSTRACT

A bicycle derailleur includes a base member mountable to a bicycle frame and a cage assembly moveably coupled to the base member. One or both of a motor and/or electrical generator system may be coupled to and moveable with the cage assembly. The motor is operable to move the cage assembly. The electrical generator system includes a generator and a generator drive system.

17 Claims, 28 Drawing Sheets

(56) References Cited

U.S. PATENT DOCUMENTS

| | | | | |
|---|---|---|---|---|
| 8,721,495 B2* | 5/2014 | Kitamura | ............... | B62M 25/08 |
| | | | | 477/7 |
| 9,005,059 B2* | 4/2015 | Suyama | ................ | B62M 9/122 |
| | | | | 474/82 |
| 9,303,763 B2* | 4/2016 | Yamaguchi | ............ | B62M 9/122 |
| 9,334,017 B2* | 5/2016 | Sala | ....................... | B62M 9/122 |
| 9,656,723 B1* | 5/2017 | Tachibana | .............. | B62M 9/122 |
| 10,220,913 B2 | 3/2019 | Kitamura | | |
| 10,793,222 B1* | 10/2020 | Harris | .................. | B62M 9/1244 |
| 10,894,574 B2* | 1/2021 | Brown | .................. | B62M 9/128 |
| 11,427,282 B2* | 8/2022 | Sala | ....................... | B62M 9/122 |
| 11,697,474 B2* | 7/2023 | Fujimoto | ............... | B62M 9/134 |
| | | | | 474/82 |
| 11,753,109 B2* | 9/2023 | Pasqua | .................. | B62M 9/122 |
| | | | | 474/82 |
| 12,202,573 B2* | 1/2025 | Liao | ........................ | B62M 25/08 |
| 2005/0187048 A1* | 8/2005 | Fukuda | ................ | B62M 9/1244 |
| | | | | 474/70 |
| 2005/0187050 A1* | 8/2005 | Fukuda | ................ | B62M 25/08 |
| | | | | 474/82 |
| 2009/0098963 A1* | 4/2009 | Watarai | ................ | B62M 25/04 |
| | | | | 474/80 |
| 2012/0322591 A1* | 12/2012 | Kitamura | ............... | B62M 9/122 |
| | | | | 474/80 |
| 2012/0322594 A1* | 12/2012 | Kitamura | ............... | B62M 9/122 |
| | | | | 474/110 |
| 2014/0162818 A1* | 6/2014 | Yamaguchi | .......... | B62M 9/1242 |
| | | | | 474/80 |
| 2015/0111675 A1* | 4/2015 | Shipman | ................ | B62M 9/124 |
| | | | | 474/82 |
| 2015/0259031 A1* | 9/2015 | Sala | ....................... | B62M 9/122 |
| | | | | 474/80 |
| 2016/0107723 A1* | 4/2016 | Tsai | ...................... | F16H 37/122 |
| | | | | 474/69 |
| 2016/0152301 A1* | 6/2016 | Bortoli | .................. | B62M 9/132 |
| | | | | 474/82 |
| 2016/0152303 A1* | 6/2016 | Bortoli | .................... | B62M 9/12 |
| | | | | 701/51 |
| 2017/0113759 A1* | 4/2017 | Watarai | .................. | B62J 43/30 |
| 2017/0120983 A1* | 5/2017 | Komatsu | ................ | B62K 25/30 |
| 2017/0166281 A1* | 6/2017 | Tachibana | .............. | B62M 9/122 |
| 2018/0178881 A1* | 6/2018 | Miglioranza | .......... | B62M 9/122 |
| 2018/0229803 A1* | 8/2018 | Wesling | .................. | B62M 9/132 |
| 2018/0237104 A1* | 8/2018 | Pasqua | .................... | B62M 9/122 |
| 2018/0354586 A1* | 12/2018 | Komatsu | ............... | B62M 9/1242 |
| 2019/0023351 A1* | 1/2019 | Tsai | ........................ | B62M 9/122 |
| 2019/0100279 A1* | 4/2019 | Brown | .................... | B62M 9/127 |
| 2019/0100280 A1* | 4/2019 | Brown | ...................... | B62M 1/36 |
| 2019/0233054 A1* | 8/2019 | Rodgers | ................. | B62M 9/122 |
| 2020/0166089 A1* | 5/2020 | Choltco-Devlin | ...... | F16D 41/30 |
| 2020/0216144 A1* | 7/2020 | Hamed | ..................... | B62K 23/06 |
| 2020/0269954 A1* | 8/2020 | Mizutani | ................ | B62M 9/128 |
| 2020/0339220 A1* | 10/2020 | Boehm | .................. | B62M 9/122 |
| 2021/0129937 A1* | 5/2021 | Sala | .......................... | H02J 7/02 |
| 2021/0129940 A1* | 5/2021 | Sala | ........................ | B62J 45/413 |
| 2022/0081064 A1* | 3/2022 | Hasegawa | ................ | B62J 45/00 |
| 2022/0194521 A1* | 6/2022 | De Poli | .................. | B62M 9/122 |
| 2022/0324534 A1* | 10/2022 | Brown | ................. | B62M 9/1248 |
| 2022/0355899 A1* | 11/2022 | Shipman | ................ | B62M 9/122 |
| 2022/0355900 A1* | 11/2022 | Shipman | ............... | B62M 9/1242 |
| 2022/0388604 A1* | 12/2022 | Zubieta Andueza | .. | B62M 9/125 |
| 2022/0411017 A1* | 12/2022 | Braedt | ................. | B62M 9/1248 |
| 2023/0002006 A1* | 1/2023 | Kok | ....................... | B62M 25/08 |
| 2023/0094161 A1* | 3/2023 | Sala | .......................... | H02J 7/02 |
| | | | | 474/80 |
| 2023/0099532 A1* | 3/2023 | Pasqua | .................. | B62M 9/122 |
| | | | | 474/82 |
| 2024/0174325 A1* | 5/2024 | Yang | ........................ | B62J 45/41 |
| 2024/0217620 A1* | 7/2024 | Liao | ..................... | B62M 9/1248 |

FOREIGN PATENT DOCUMENTS

| | | |
|---|---|---|
| DE | 102019204885 | 10/2020 |
| EP | 2535254 | 12/2012 |
| EP | 2535257 A1 | 12/2012 |
| TW | 201325034 | 6/2013 |
| TW | I644831 | 12/2018 |
| TW | 202108439 | 3/2021 |
| TW | 202108443 | 3/2021 |
| WO | 9526900 | 10/1995 |
| WO | 2015068125 | 5/2015 |

* cited by examiner

BICYCLE DERAILLEUR

This application claims the benefit of U.S. patent application Ser. No. 17/314,949, filed May 7, 2021, which is hereby incorporated by reference in its entirety.

FIELD OF THE DISCLOSURE

The present application generally relates to a bicycle derailleur, including for example and without limitation a bicycle rear derailleur incorporating an energy harvesting system.

BACKGROUND

Bicycle derailleurs are commonly incorporated into a drivetrain of a bicycle. The typical drivetrain also includes a crank assembly that is coupled to one or more drive sprockets. The crank assembly is operable to drive a chain that is routed or wrapped around one of the drive sprockets. The chain may also be routed to one of wheels of the bicycle, for example a rear wheel, wherein the chain may engage one or more driven sprockets. Derailleurs are provided as a part of the drivetrain. For example, one derailleur (e.g., front) may be located adjacent the one or more drive sprockets, while another derailleur (e.g., rear) may be located adjacent the driven sprockets, for example adjacent the rear wheel. The derailleur(s) may be actuated to selectively shift the chain of the drivetrain between the drive sprockets, and/or to selectively shift the chain between the one or more of the driven sprockets. Shifting of the bicycle chain from one drive sprocket to another, or from one driven sprocket to another, is done in order to change the gear ratio of the drivetrain. The rear derailleur may also apply a tension to the chain to take-up slack, as well as to maintain the desired tension, in the chain on the non-drive-side of the drivetrain.

In some embodiments, the rear derailleur may be a wireless, electrically actuated rear derailleur, which relies on a battery to supply power to a motor. The battery may need to be periodically charged or replaced, which may be an inconvenience if the battery is discharged during use of the bicycle, or at a remote location not conveniently located to a charging station or providing access to replacement batteries.

SUMMARY

In one aspect, one embodiment of a bicycle derailleur may include a base member mountable to a bicycle frame and a cage assembly moveably coupled to the base member. The cage may be moveable in opposite first and second directions relative to the base member. A motor may be coupled to and moveable with the cage assembly in the opposite first and second directions. The motor may be operable to move the cage assembly in the opposite first and second directions. In one embodiment, the cage assembly may include a chain pulley rotatably coupled to the cage assembly about a first rotation axis.

In another aspect, one embodiment of a bicycle derailleur may include a base member mountable to a bicycle frame and a cage assembly moveably coupled to the base member. An electrical generator system may be coupled to and moveable with the cage assembly. The electrical generator system may include a generator and a generator drive system. The generator drive system may include a chain pulley rotatably coupled to the cage assembly about a first rotation axis and a generator transmission operably coupled between the chain pulley and the generator.

In another aspect, one embodiment of a bicycle derailleur may include a base member mountable to a bicycle frame and a cage assembly moveably coupled to the base member. An electrical generator system may be coupled to and moveable with the cage assembly. The electrical generator system may include a generator and a generator drive system. The generator drive system may include a chain pulley rotatable about a first rotation axis in opposite first and second rotational directions and a clutch. The clutch may drivably connect the chain pulley and the generator when the chain pulley is rotated in the first rotational direction such that the generator is activated. The clutch disconnects the chain pulley and the generator when the chain pulley is rotated in the second rotational direction such that the generator is deactivated.

In another aspect, a bicycle derailleur may include a base member mountable to a bicycle frame and a cage assembly moveably coupled to the base member. An electrical generator system may be coupled to and moveable with the cage assembly. The electrical generator system may include a generator and a generator drive system. The generator drive system may include a chain pulley rotatable about a first rotation axis, at least first and second pulleys rotatable about second and third rotation axes respectively, and a belt engaged with the first and second pulleys. In one embodiment, the first and second pulleys may have a pulley ratio greater than 1.

The various aspects and embodiments of the derailleur, and the methods for the use and assembly thereof, may provide significant advantages over other derailleurs and methods. For example and without limitation, the motor and/or the electrical generator system may be mounted on and moveable with the cage. If damaged, the cage, including the motor and electrical generator system, may be quickly and easily replaced without having to replace the other components of the derailleur. In addition, the cage, which may include a chain pulley engageable by a chain, provides an input to the generator system and motor, with the components being positionally fixed relative to each other and moveable with the cage as the cage is: (1) moved laterally during a gear changing sequence, and/or (2) rotated to maintain a tension in the chain. In this way, the assembly avoids the need for couplings, whether electrical or mechanical, between any components located on the cage and components located on other parts of the derailleur, which may be moveable relative to each other. In addition, the electrical generator system ensures that power is always available to power the motor, for example during shifting, and/or for other activities and accessories requiring electrical power.

The foregoing paragraphs have been provided by way of general introduction and are not intended to limit the scope of the claims presented below. The various preferred embodiments, together with further advantages, will be best understood by reference to the following detailed description taken in conjunction with the accompanying drawings.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

Figure 2:
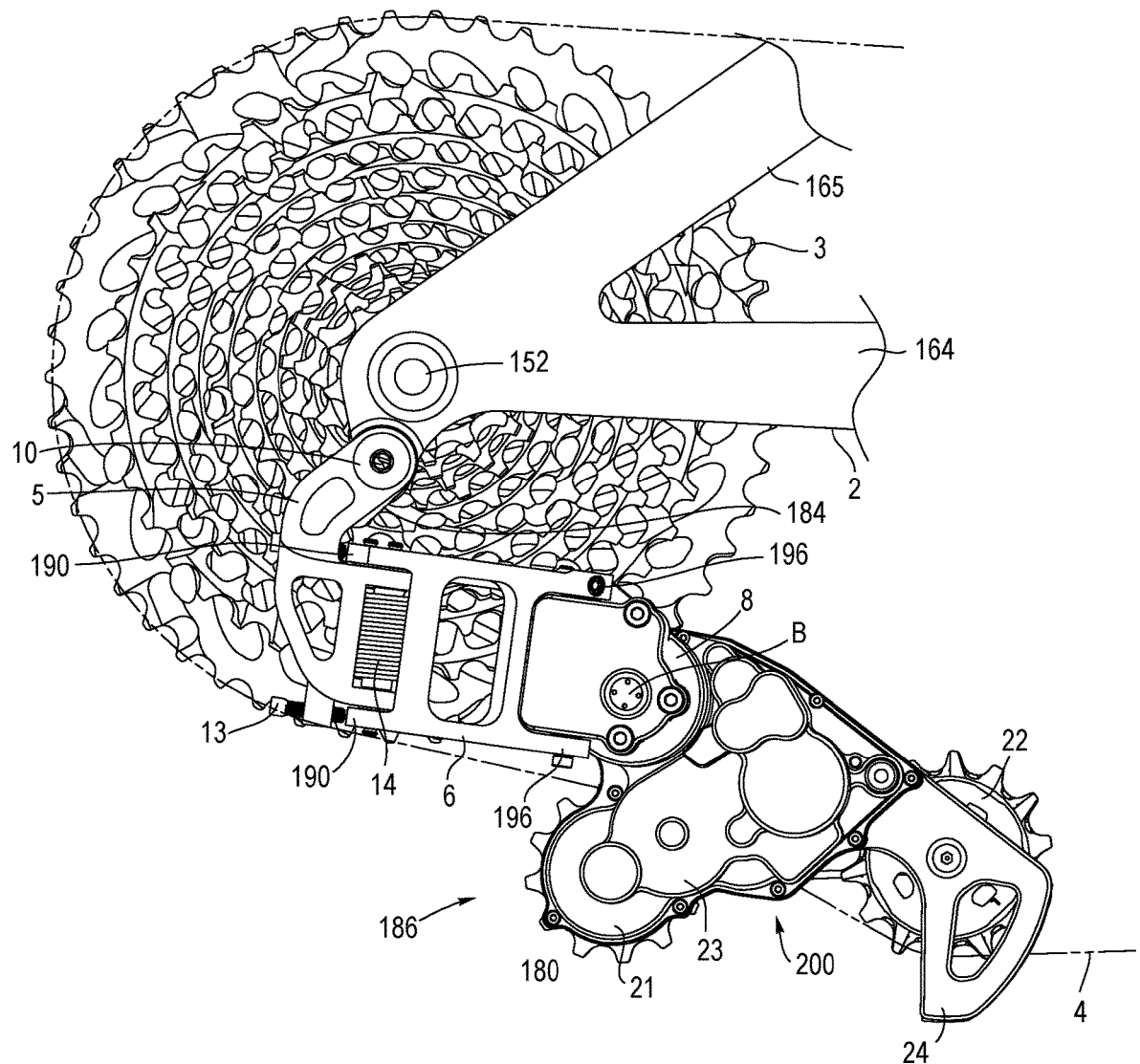
FIG. 2 is a partial side view of a bicycle assembled with a rear derailleur having a cage assembly in a fully rotated counterclockwise position.

It should be understood that the term "plurality," as used herein, means two or more. The term "longitudinal," as used herein means of or relating to a length or lengthwise direction. The term "lateral," as used herein, means situated on, directed toward or running in a side-to-side direction. The term "coupled" means connected to or engaged with, whether directly or indirectly, for example with an intervening member, and does not require the engagement to be fixed or permanent, although it may be fixed or permanent. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. It should also be understood that designation of "first" and "second" does not necessarily mean that the two components or values so designated are different, meaning for example a first direction may be the same as a second direction, with each simply being applicable to different components. The terms "upper," "lower," "rear," "front," "fore," "aft," "vertical," "horizontal," "right," "left," "inboard," "outboard" and variations or derivatives thereof, refer to the orientations of an exemplary bicycle 150, shown in FIG. 37, from the perspective of a user seated thereon, for example with an "inboard" component or feature being closer to a vertical mid-plane of the bicycle extending in a direction 201. The term "transverse" means non-parallel. The terms "outer" and "outwardly" refers to a direction or feature facing away from a centralized location, for example the phrases "radially outwardly," "radial direction" and/or derivatives thereof, refer to a feature diverging away from a centralized location, for example a rotation axis 152 of the cassette 3 as shown in FIG. 2. Conversely, the terms "inward" and "inwardly" refers to a direction facing toward the centralized or interior location. The term "subassembly" refers to an assembly of a plurality of components, with subassemblies capable of being further assembled into other subassemblies and/or a final assembly, such as the bicycle 150.

Figure 37:
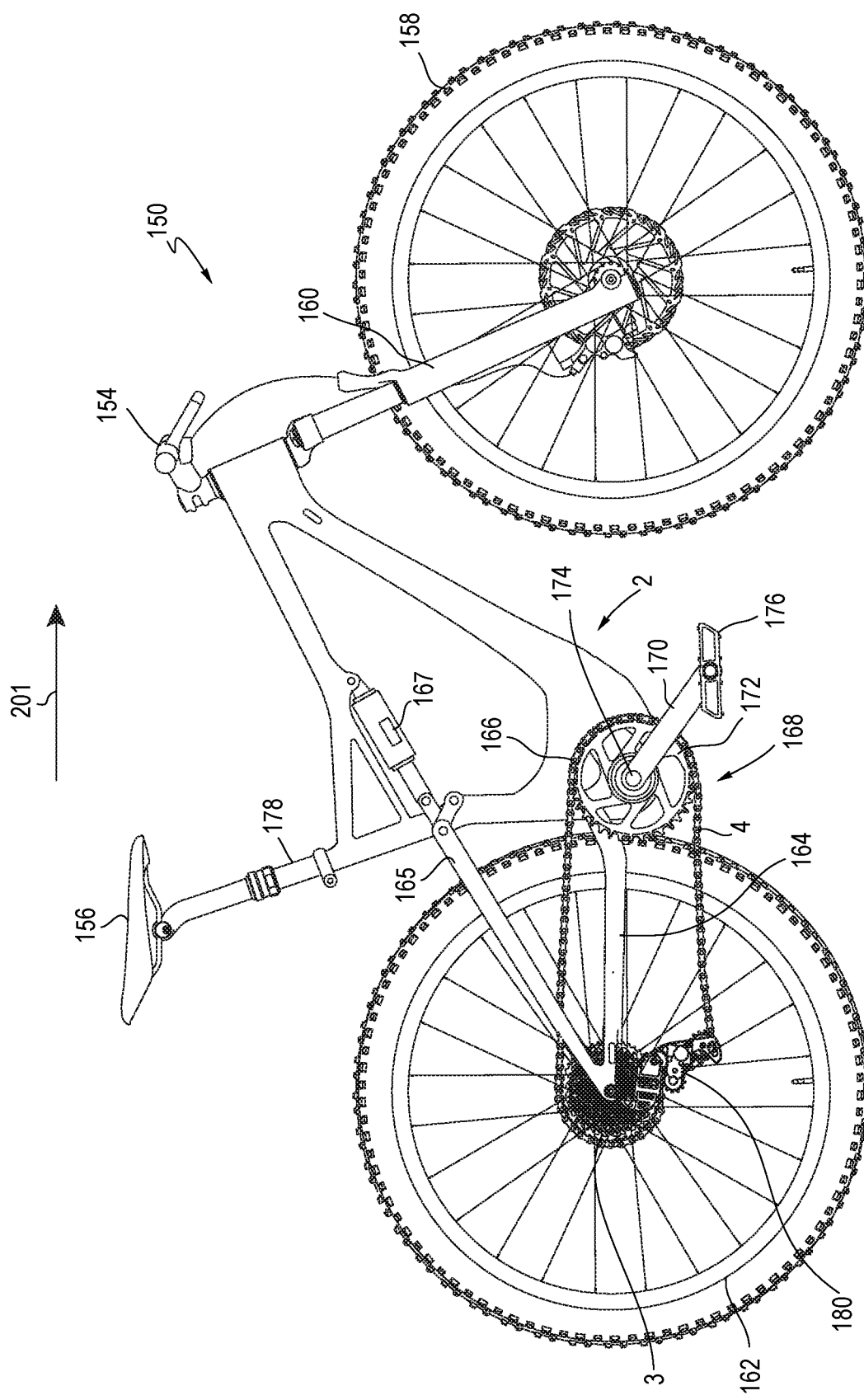
FIG. 37 shows a side view of a bicycle having a rear derailleur.

Bicycle:

FIG. 37 illustrates one example of a human powered vehicle. In this example, the vehicle is one possible type of bicycle 150, such as a road bicycle. The bicycle 150 has a frame 2, handlebars 154 near a front end of the frame, and a seat or saddle 156 for supporting a rider over a top of the frame. The bicycle 150 has a first or front wheel 158 carried by a front fork subassembly 160 supporting the front end of the frame. The bicycle 150 also has a second or rear wheel 162 supporting a rear end of the frame 2, which includes a pair of chain stays 164 connected to a pair of seat stays 165 (see also FIG. 1). The rear end of the frame 2 may be supported by a rear suspension component, such as a rear shock 167. The bicycle 150 also has a drive train 168 with a crank assembly 166 that is operatively coupled via a bicycle chain 4 to a rear cassette 3, otherwise referred to as a driven sprocket assembly, near the hub providing a rotation axis of the rear wheel 162. The crank assembly 166 includes at least one, and typically two, crank arms 170 and pedals 176, along with a front chainring assembly 172, or drive sprocket assembly. A crank spindle or shaft may connect the two crank arms. The crank shaft defines a center rotational axis 174 of the chainring assembly 172. The crank assembly may also include other components.

A rear gear change device, such as a rear derailleur 180, is disposed at the rear wheel 162 to move the bicycle chain 4 to different sprockets of the cassette 3. In one embodiment, a front gear changer device, or front derailleur, may be provided to move the chain 4 to different sprockets of the chainring assembly. In the illustrated example, the saddle 156 is supported on a seat post 178 having an end portion received in a top of a frame seat tube of the frame 2.

In FIG. 37, a normal riding or forward moving direction 201 of the bicycle 150 is shown. While the bicycle 150 depicted in FIG. 37 is a mountain bicycle, the rear gear change device, or rear derailleur 180, including the specific embodiments and examples disclosed herein as well as alternative embodiments and examples, may be implemented on other types of bicycles. For example and without limitation, the disclosed rear derailleur 180 may be used on road bicycles, and any other type of bicycle incorporating a derailleur. It should be understood that the various energy harvesting systems and embodiments disclosed herein may also be incorporated into derailleurs, at any location (e.g., front), having a cage assembly with a rotatable wheel.

Rear Derailleur:

Referring to FIGS. 1-6 and 28, the rear derailleur 180 includes a base member 5, otherwise referred to as b-knuckle, which may be attached to the bicycle frame 2 with a fastener 10, for example a b-bolt. The frame 2 may include a hanger 184 connected to the frame 2 at a junction between the seat stay 165 and the chain stay 164. The base member 5 may be connected to the hanger frame 184, or directly to the frame 2. The base member 5 is removeably coupled to the frame 2 with the fastener 10, and may be free to pivot around an axis (A) of the fastener 10. An adjustment member 11, which may be configured as a screw, is threadably engaged with the base member, and may be actuated so as to adjust the rotational position of the base member 5 with respect to frame 2.

Figure 29:
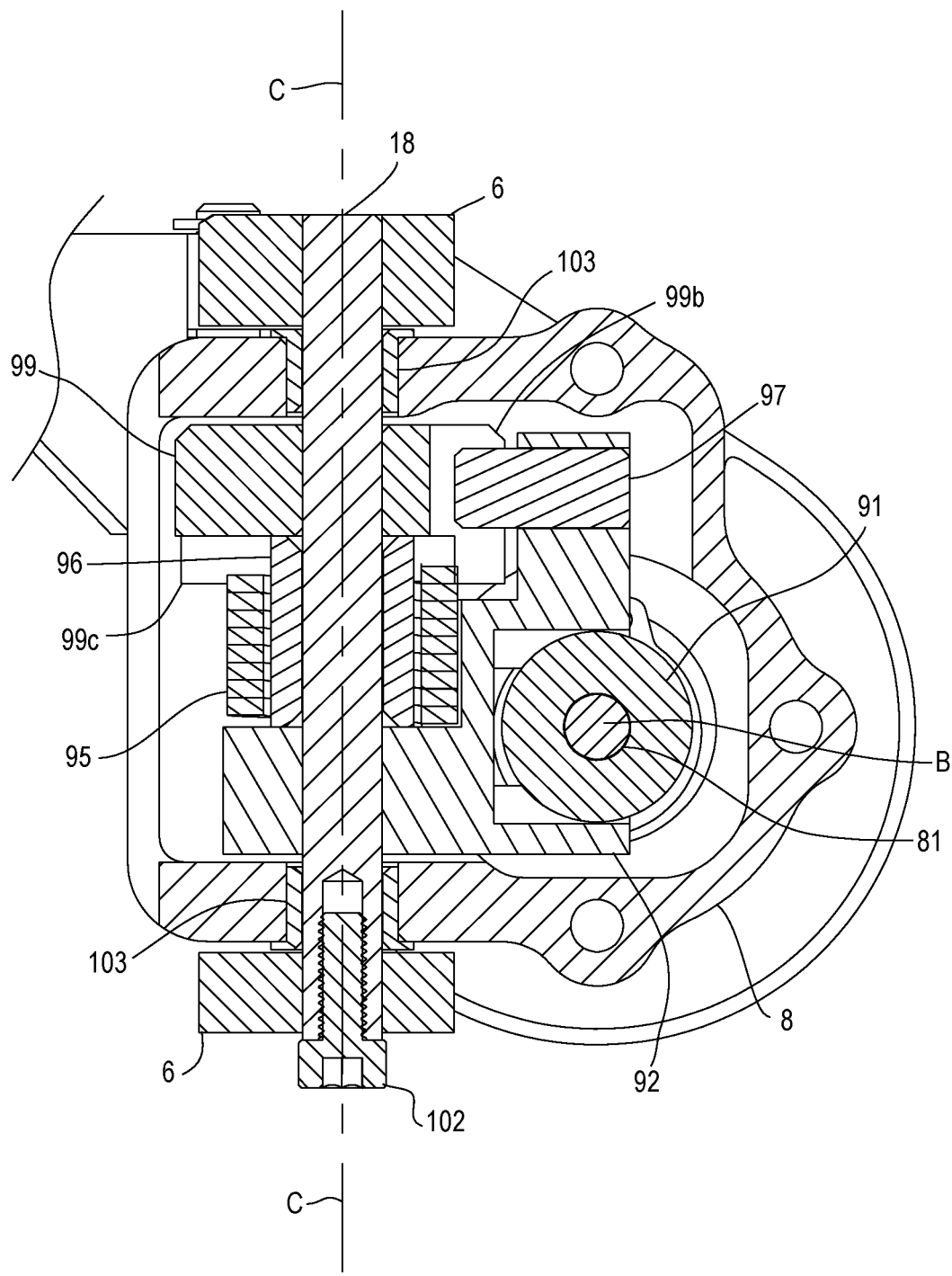
FIG. 29 is a cross-sectional view taken along line 29-29 in FIG. 5.
Figure 30:
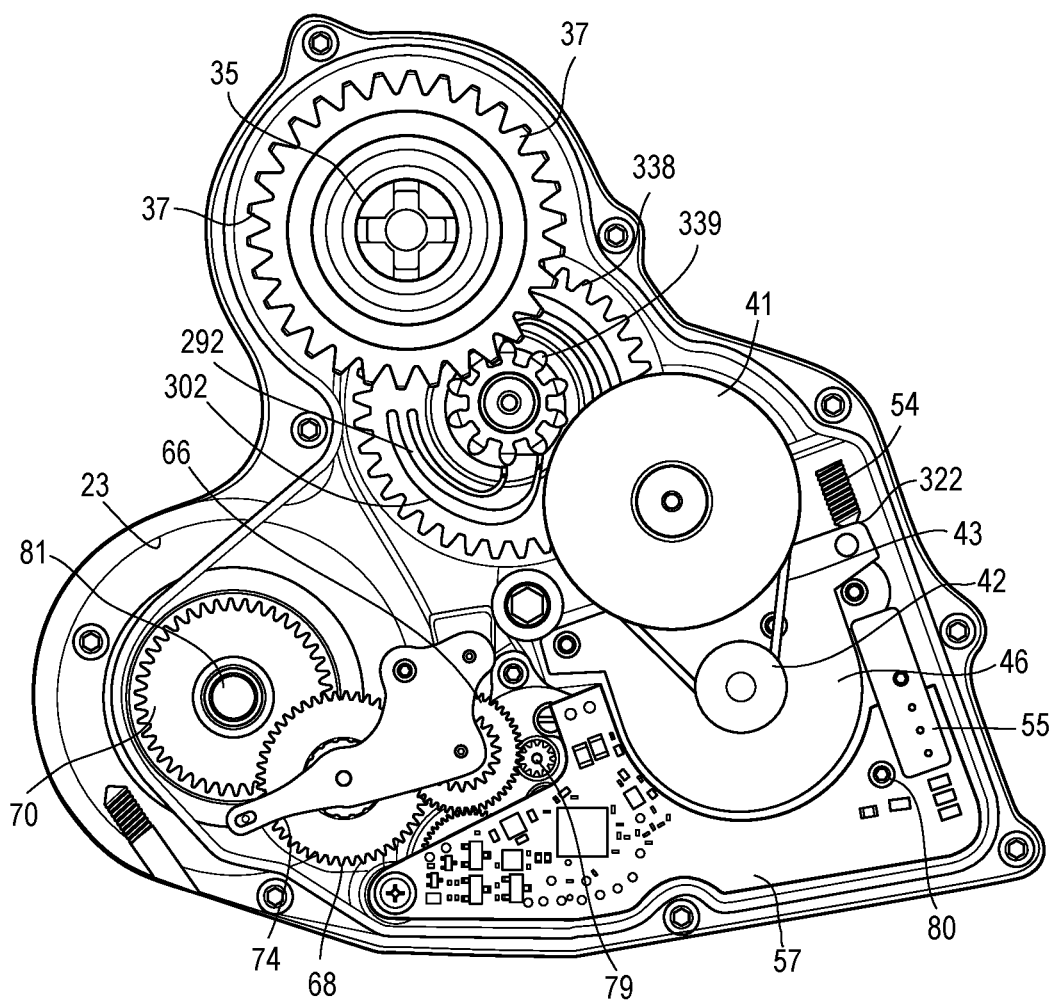
FIG. 30 is a partial side view of another cage assembly embodiment.

A linkage 186 includes an inner link 7 and an outer link 6 having first ends 188, 190 that are rotatably connected to the base member 5, for example with a first axle or pin 15 and a second axle or pin 16, respectively. A moveable member 8, otherwise referred to as a p-knuckle, is rotatably connected to opposite second ends 194, 196 of the inner link 7 and the outer link 6 with a third axle or pin 17 and a fourth axle or pin 18, respectively, such that the links 6, 7 extend between the base member 5 and moveable member 8. The pin 18 may be supported by a pair of bushings 103 in the moveable member 8 as shown in FIG. 29. The base member 5, moveable member 8, inner link 7, and outer link 6 form a four-bar linkage, and in particular a parallelogram linkage 186. In this way, the moveable member 8 may be moveably coupled to the base member 5. In one embodiment, the moveable member 8 is moveable relative to the base member 5, and the frame 2, in opposite inboard and outboard directions. It should be understood that the moveable member 8 may be moveably connected to the base member 5 with other components and/or linkages other than the disclosed linkage, which may or may not include one or more links.

Figure 3:
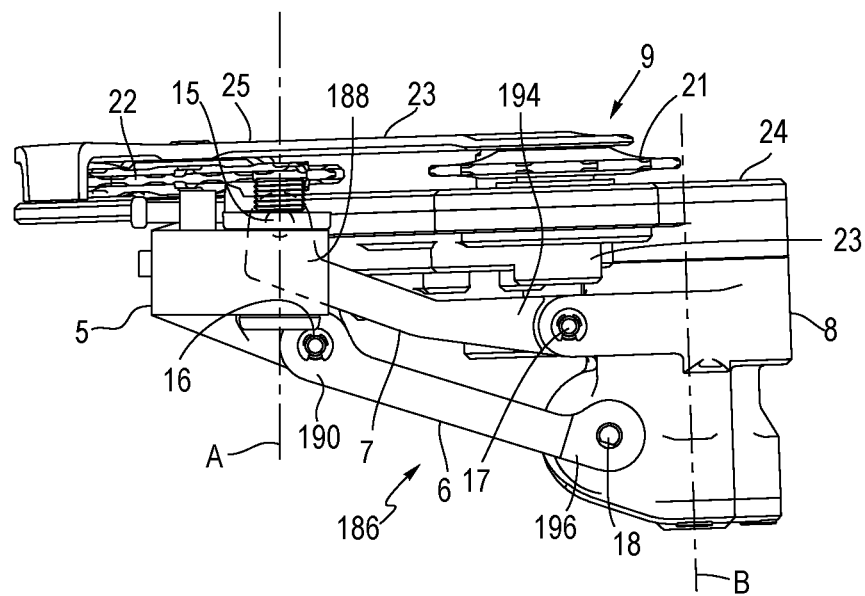
FIG. 3 is a top view of a rear derailleur in an extreme outboard position.

A biasing member 14, which may be configured as a torsion spring, biases the linkage 186 to rotate clockwise, or outboard, as shown in FIG. 3, for example about the first and second pins 15, 16. In one embodiment, the biasing member 14 may be arranged co-axially with second pin 16 and have a first end engaging the base member and a second end engaging the linkage 186, for example the outer link 6. The derailleur may include a rotational limit, including for example an upper limit screw 12 and a lower limit screw 13, which are threadably engaged with base member 5 and limit the movements of the inner link 7 and the outer link 6, respectively.

In an alternative embodiment, the biasing force of the biasing member 14 may be reversed, such that the biasing member 14 bias the linkage 186 to rotate counterclockwise, or inboard, with reference to FIG. 3. In operation, the chain 4 may apply a drag force to a pulley wheel 22, which may cause the linkage 186 to want to rotate counterclockwise as shown in FIG. 3. In this embodiment, the biasing member 14 and pulley wheel 22 work together in tandem to bias the linkage 186 in the same direction. As such, the parallelogram linkage is biased in the same rotational direction by the biasing force applied by the biasing member 14 and the drag force applied by the chain to the pulley wheel 22.

Figure 7:
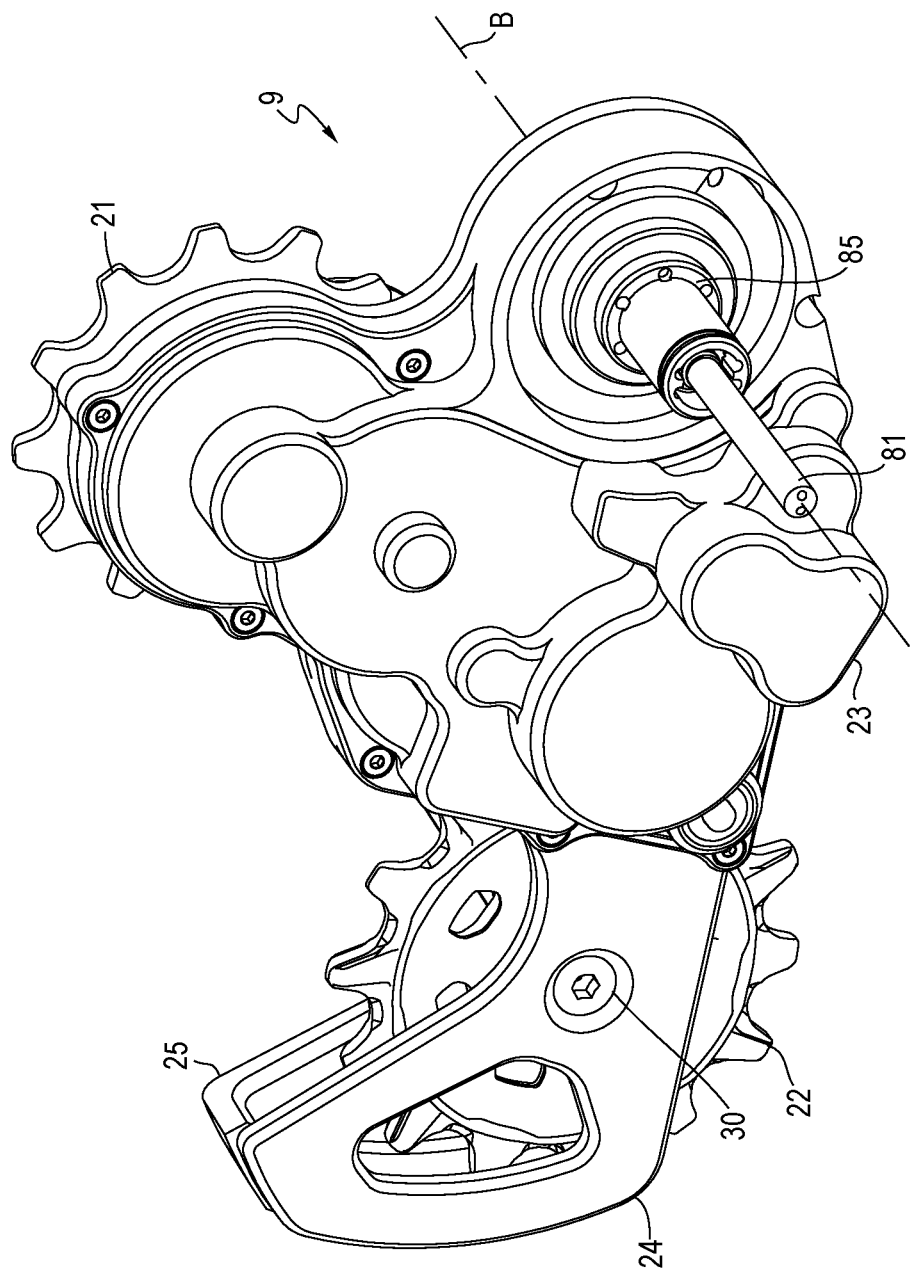
FIG. 7 is a side perspective view of a cage assembly.
Figure 8:
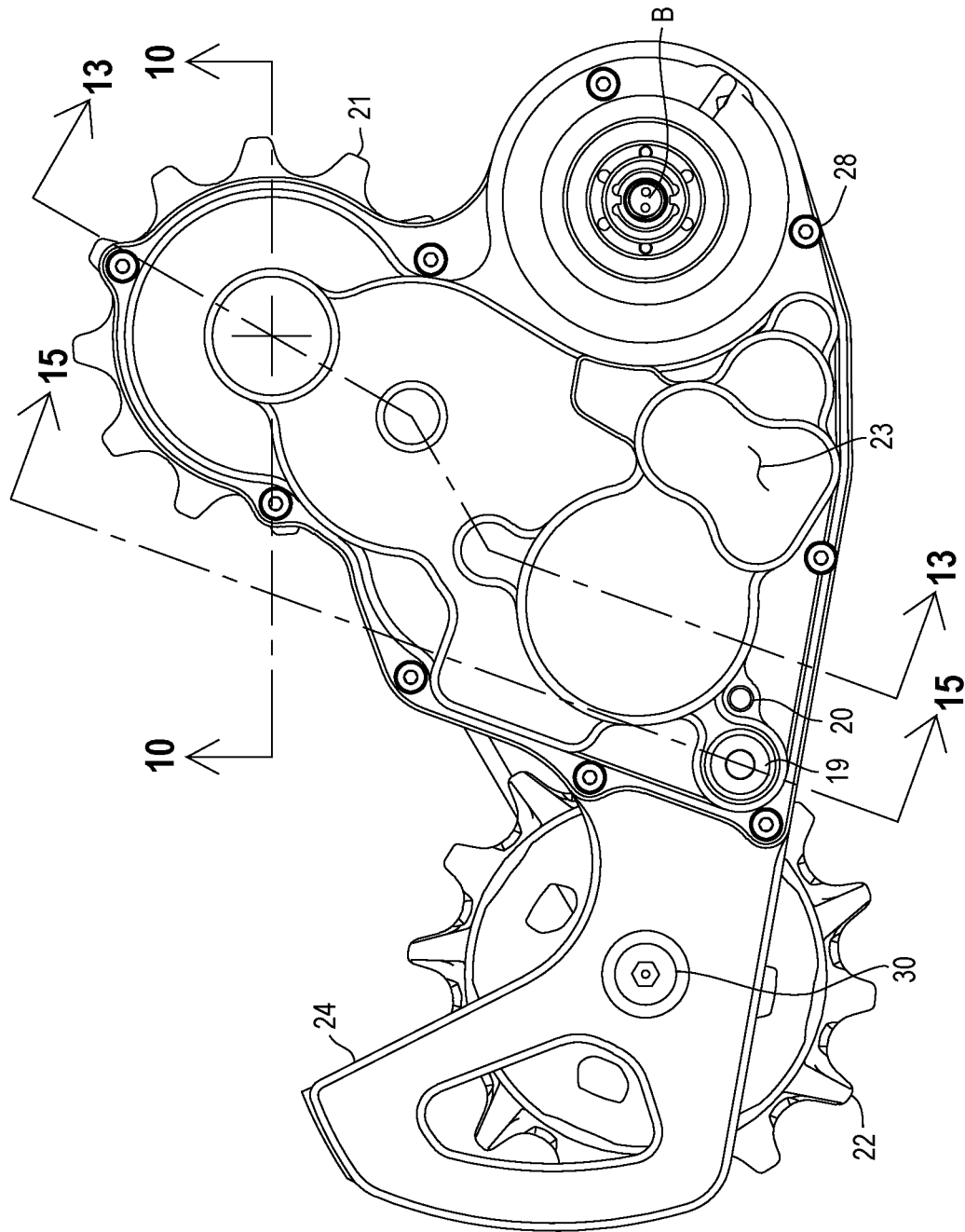
FIG. 8 is an outboard side view of the cage assembly shown in FIG. 7.
Figure 9:
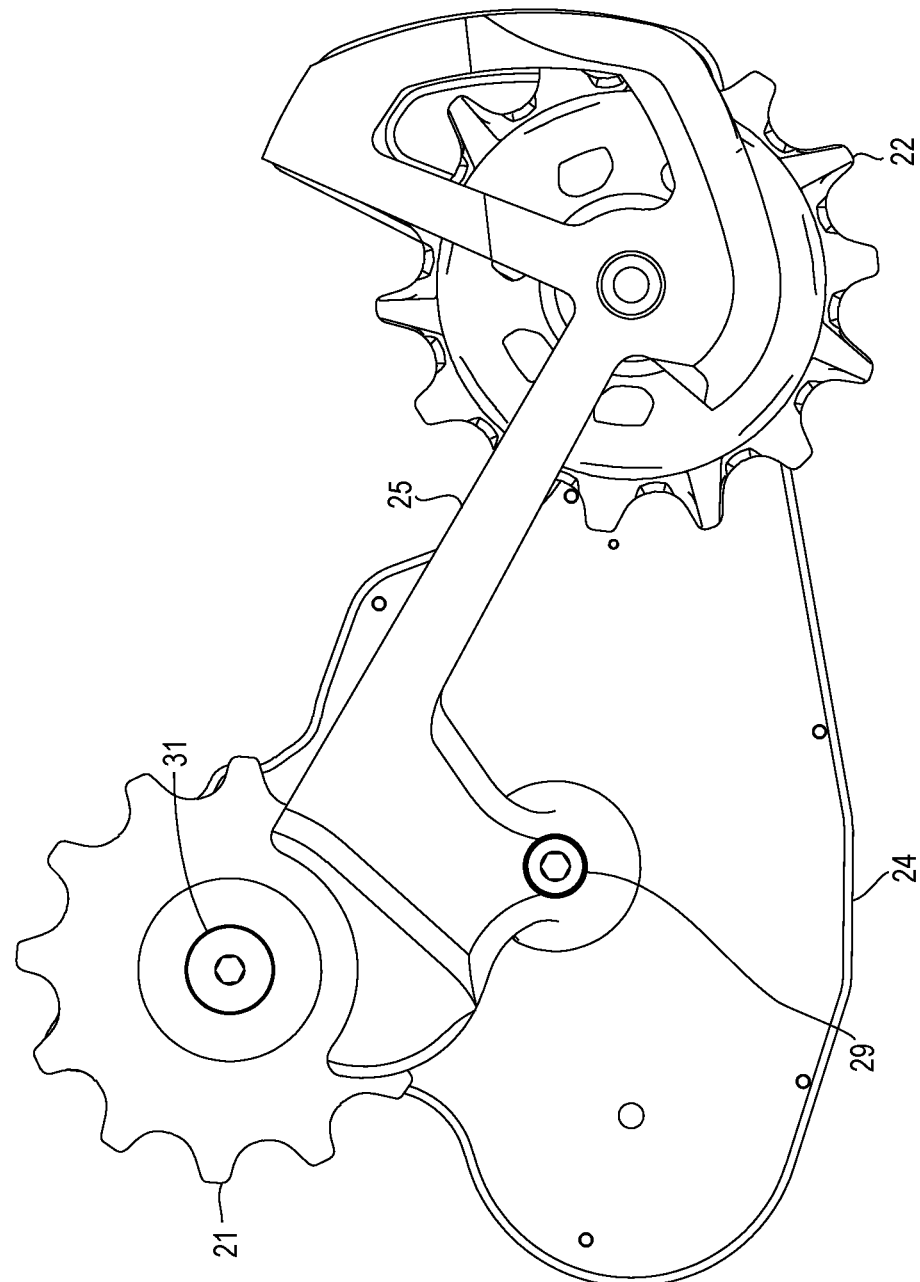
FIG. 9 is an inboard side view of the cage assembly shown in FIG. 7.

Referring to FIGS. 7-9, the derailleur 180 may include a cage assembly 9 moveably coupled to the base member 5. The cage assembly 9 is moveable in opposite first and second translation directions (e.g., inboard and outboard) relative to the base member 5. The cage assembly 9 may also be moveable in opposite first and second rotational directions (e.g., clockwise and counterclockwise rotation) about a laterally extending axis B relative to the moveable member 8 and the base member 5, or moveable relative to the base member 5 with a combination of translation and rotation. In particular, the cage assembly 9 is rotatably connected to the moveable member with a fastener extending in a lateral direction and defining the rotation axis B. The cage assembly may rotate clockwise around the axis B of the fastener to take up slack in the chain 4, which is engaged with the cassette 3, an upper chain pulley 21 and a lower chain pulley 22. The upper and lower chain pulleys 21, 22 are rotatably connected to the cage assembly 9.

Figure 10:
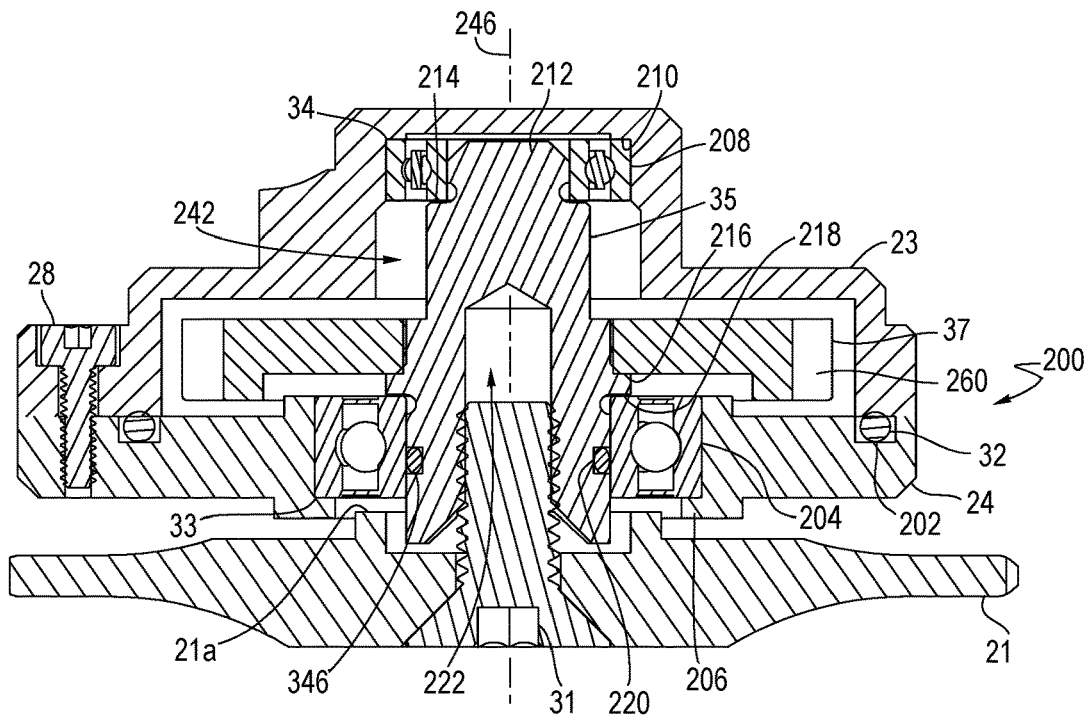
FIG. 10 is a cross-sectional view of the cage assembly taken along line 10-10 in FIG. 8.
Figure 13:
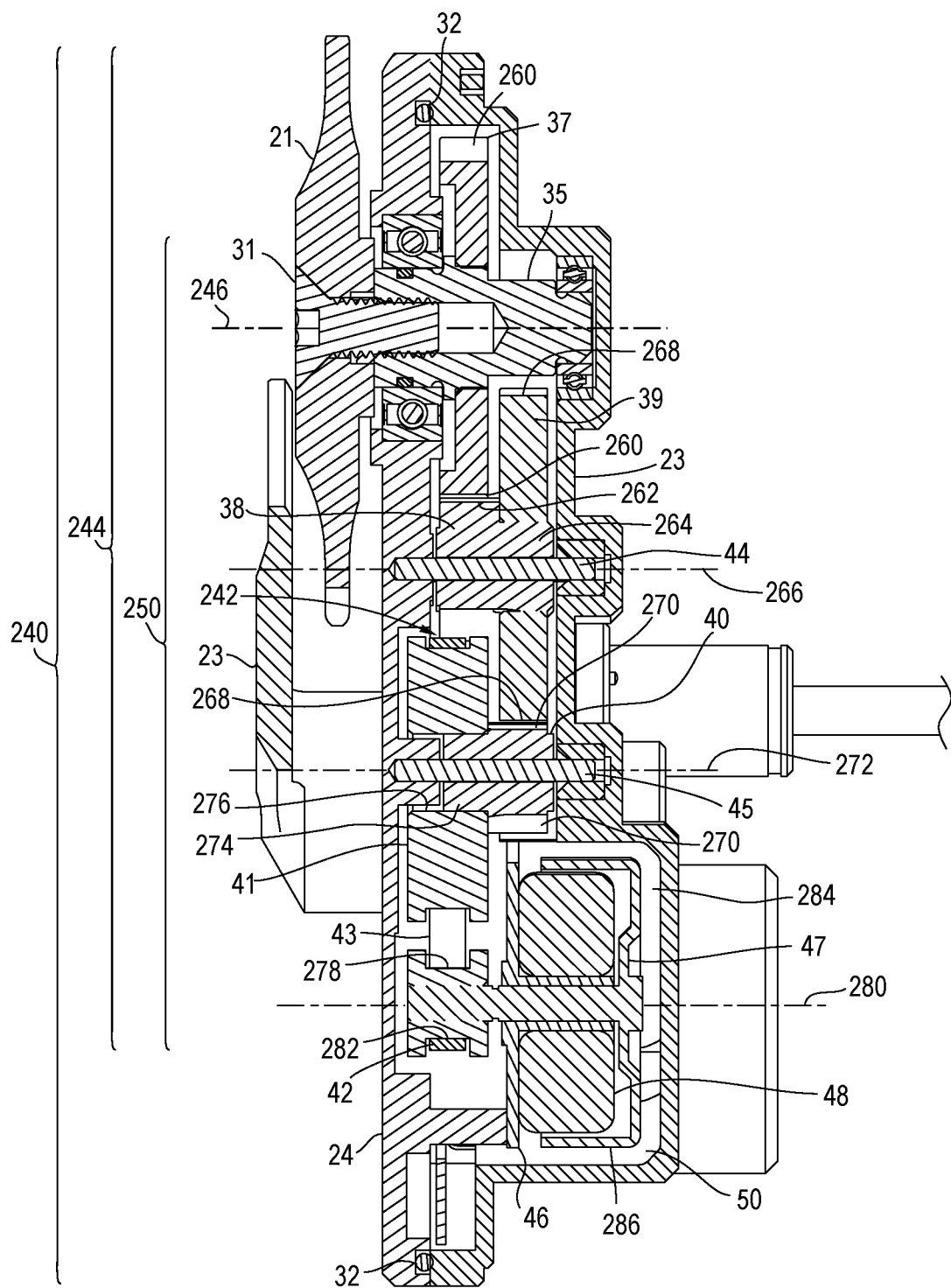
FIG. 13 is a cross-sectional view of the of the cage assembly taken along line 13-13 in FIG. 8.

Referring to FIGS. 5-9, 10 and 13, the cage assembly 9 may include one or both of an outer cage 24 secured to an inner cage 25, for example with fasteners 29, 30, configured as screws, a snap-fit, and/or other know suitable securing devices. The lower chain pulley 22 rotates on a ball bearing having an inner race clamped between the inner cage 25 and the outer cage 24 with the fasteners, configured as a screw 30, threaded into the inner cage 25. This connection also serves to fix the inner cage 25 to the outer cage 24. A cover 23 is fixed to the outer cage 24 with a plurality of fasteners 28, shown as nine screws, spaced apart around the perimeter of the cover 23, with the cover and outer cage defining a housing 200. It should be understood that the term "housing" refers to a component capable of supporting or holding other components, and may be enclosed or open. As such, the outer cage and/or cover may each individually define a housing, or may in combination define the housing 200, which is enclosed and sealed to prevent the intrusion of fluid into an interior of the housing in one embodiment. Referring to FIGS. 10 and 13, an elastomeric sealing element 32 may be disposed in a groove 202 formed in the outer cage 24. It should be understood that the groove may alternatively be formed in the cover. The groove 202 may define a closed loop that follows the contour of the perimeter of the cover 23, with the sealing element 32 forming a fluid-tight seal between the outer cage 24 and cover 23, or housing 200. In one embodiment, the fastener 29 is threadably engaged with outer cage 24, and fixes the inner cage 25 to the outer cage 24.

As shown in FIGS. 10-13, one embodiment of the upper wheel pulley assembly include a sealed ball bearing assembly 33 received in a recess 204 formed in the outer cage 24 and engaged by the shoulder of an annular flange 206. A ball bearing assembly 34 is received in a recess 208 formed in the cover 23, and is supported on an outer side surface 210 of the housing. A pulley shaft 35 is disposed inside, and supported by, the inner races of ball bearing assemblies 33 and 34. The pulley shaft 35 has an end 212 rotatably supported by the ball bearing assembly 34, with an annular shoulder 214 engaging the inner race and trapping the bearing assembly 34 between the shoulder 214 and the surface 210. The pulley shaft 35 includes an annular flange 216 spaced laterally from the annular shoulder 214, with the annular flange 216 defining a second annular shoulder 218 engaging the inner race of the ball bearing 34 and trapping the bearing assembly 33 between the shoulder 218 and the annular flange 206. The annular shoulders 214, 216 face in opposite directions such that the annular shoulders limit the axial movement of the shaft 35 in both lateral directions (inboard and outboard). The ball bearing assembly 33 is captured between the outer cage 24, or an annular shoulder defined thereby, and the annular shoulder 216 of the shaft 35. A sealing element 346, configured in one embodiment as an O-ring, is located in a circumferential groove 220 formed in the shaft 35 inboard and spaced apart from the annular flange 216. The groove may alternatively be formed in the ball bearing assembly. The sealing element 346 forms a fluid-tight seal between the pulley shaft 35 and the inner race of the ball bearing assembly 33, such that fluid is prevented from entering the interior space of the housing 200 defined between the cover 23 and the outer cage 24. The pulley shaft 35 may include an axially extending hole 222. The hole 222 may be threaded and threadably engaged by a fastener 31, shown as a screw.

Figure 11:
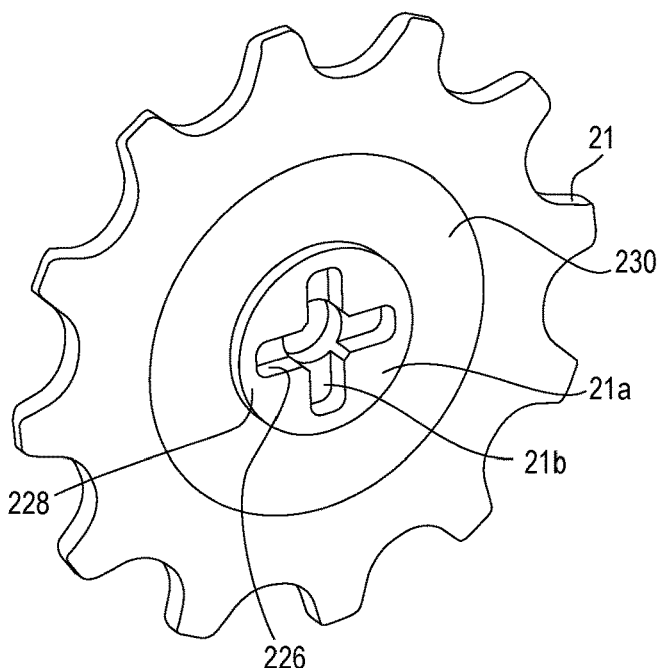
FIG. 11 is a perspective view of a chain pulley.
Figure 12:
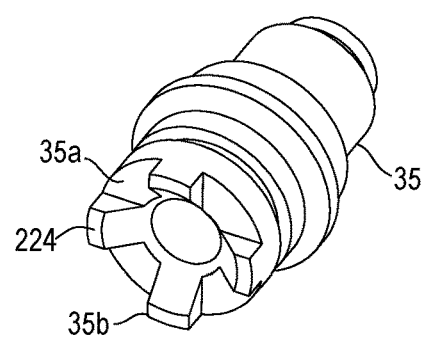
FIG. 12 is a perspective view of a chain pulley shaft.

Referring to FIGS. 11 and 12, the upper chain pulley 21 may include a key hole 21b, having a cross-shaped recess 226 in one embodiment. The pulley shaft 35 may be configured with a corresponding key 224, or insert portion configured with mating corresponding cross-shaped protrusions 35b. When the upper chain pulley 21 is assembled as shown in FIG. 10, the key 224 interfaces and ensures a non-rotatable engagement or coupling with the key hole 21b, for example by way of the engagement of the recesses 226 by the protrusions 35b. The chain pulley 21 includes a hub 228 having an inner surface 230 that abuts an end surface 35a of the pulley shaft 35 defined between the protrusions 35b. By way of the interface between the key 224 and key hole 21b, the upper chain pulley 21 is non-rotatably and axially secured to the pulley shaft 35, such that torsion may be transmitted between the upper chain pulley 21 and the pulley shaft 35 via the key 224 and key hole 21b, i.e., between the protrusions 35b and recesses 226. As shown in FIG. 10, the pulley shaft 35 is captured between the cover 23 and the outer cage 24, with the chain pulley 21 secured to the shaft 35. As such, the chain pulley 21 is not captured or clamped between the inner and outer cages 25, 24. Rather, the chain pulley 21 is supported in a cantilevered fashion on an end of the shaft 35, which is supported by the housing 200 outboard of the chain pulley 21. As such, the inner cage 25 may not overlie the chain pulley 21, and in particular the pulley shaft 35, but rather may be configured to provide clearance between the inner cage 25 and the upper pulley system as shown in FIG. 9. To replace the chain pulley, the inner cage 25, therefore, does not need to be removed from the outer cage 24. Of course, in other embodiments, the inner cage may overlie the chain pulley.

Electrical Generator System:

Referring to FIGS. 13-16, 19, 30 and 31, an electrical generator system 240 is coupled to and moveable with the cage assembly 9, meaning the electrical generator system 240 translates and rotates with the cage assembly 9 as the cage assembly moves relative to the moving member 8, base 5 and bicycle frame 2. Put another way, the electrical generator system is fixed to the cage assembly and follows the movement path of the cage assembly. In one embodiment, the electrical generator system 240 is disposed in the housing 200, defined by the cover 23 and outer cage 24, and may be entirely enclosed within a sealed interior cavity 242 defined between the cover 23 and outer cage 24. The electrical generator system 240 includes a generator 50 and a generator drive system 244, with the generator drive system 244 including an input. The input may be configured in one embodiment as the chain pulley 21 rotatably coupled to the housing 200, and the outer cage 24 and cover 23 in particular. The chain pulley 21 is rotatable about a rotation axis 246. The generator drive system may further include a generator transmission 250 operably coupled between the input, e.g., chain pulley 21, an output, e.g., the generator 50. The generator transmission 250 includes a first generator spur gear 37, which is non-rotatably and axially fixed to the pulley shaft 35, such that the spur gear 37 rotates with the chain pulley 21 about the rotation axis 246. For example and without limitation, the spur gear 37 may be fixed to the pulley shaft with a friction fit, and/or with a spline interface. The spur gear 37 is disposed in a space, or interior cavity 242, defined between the cover and outer cage. The first generator spur gear 37 has a plurality of teeth 260 spaced circumferentially around the perimeter of the spur gear, with the teeth 260 engaged with teeth 262 spaced circumferentially around the perimeter of a pinion gear 38. The pinion gear 38 is rotatable about an axle 44 supported by and between the outer cage 24 and cover 23. In one embodiment, the spur gear 37 has thirty (30) teeth 260, while the pinion gear 38 has ten (10) teeth 262, providing a gear ratio of 3:1, meaning that one rotation of the spur gear 37 results in three (3) rotations of the pinion gear 38. In one embodiment, the chain pulley 21 has a plurality of teeth, for example 12. In one embodiment, the axle 44 has a first end engaged with the outer cage 24, for example a non-rotatable engagement, e.g., threaded, such that the axle 44 is non-rotatable, with an opposite second end engaged with the cover 23. Alternatively, the axle 44 may be allowed to rotate relative to the outer cage 24. The pinion gear 38 includes a hub 264 that rotates on the axle 44 about a rotation axis 266. A second generator spur gear 39 is co-axially and non-rotatably fixed to first generator pinion gear 38, 338, and to the hub 264 in particular, and rotates with and is driven by the pinion gear 38, 338. The spur gear 39, 339 has thirty-six (36) teeth 268 spaced circumferentially around a perimeter thereof in one embodiment. The teeth 268 of the spur gear engage teeth 270 spaced circumferentially around the perimeter of a pinion gear 40, which is supported by and rotatable about an axle 45 rotatably or non-rotatably supported by and between the outer cage 24 and cover 23. In one embodiment, the axle 45 has a first end engaged with the outer cage 24, for example a threadable engagement such that the axle is non-rotatable, with an opposite second end engaged with the housing 24. In another embodiment, the axle is rotatably supported by and between the outer cage 24 and cover 23. The pinion gear 40 includes a hub 274 that rotates on the axle about a rotation axis 272. The pinion gear may have for example twelve (12) teeth 270, providing a gear ratio of 3:1 between the spur gear 39 and pinion gear 40, meaning that one rotation of the spur gear 39 results in three (3) rotations of the pinion gear 40.

The generator transmission 250 also includes at least first and second pulleys 41, 42 rotatably coupled to the housing 200 about rotation axes 272, 280 respectively, and a belt 43 engaged with the first and second pulleys. In one embodiment, a first generator pulley 41 preferably has a plurality of teeth 276, for example 75 teeth 276, and is co-axially and non-rotatably fixed to the hub 274 of the pinion gear 40, with the pulley 41 and pinion gear 40 being rotatable about the rotation axis 272. The second pulley 42 has a plurality of teeth 278, for example 20 teeth, and is co-axially and non-rotatably fixed to a rotor 47 of the generator 50, with the pulley 42 and rotor 47 being rotatable about the rotation axis 280. A belt 43 forms a continuous or endless loop. In one embodiment, the belt 43 may be a toothed belt having a plurality of teeth 282 formed around an inner surface of the loop. In one embodiment, the belt 43 may include for example and without limitation 91 teeth 282. The belt 43, and the teeth 282 in particular, are engaged with the first and second pulleys 41, 42 and the teeth 276, 278 thereof. The pulleys 41, 42 have a pulley ratio of greater than 1, and in one embodiment a ratio of 3.75:1. It should be understood that in other embodiments, the belt 43 and pulleys 41, 42 may be configured without teeth, with the belt 43 engaging the pulleys 41, 42 by way of friction. The rotor 47 is rotatably received in a bore 284 defined by a generator base 46. The generator 50 includes a stator 48 disposed inside an outer periphery, or annular wall 286, of the rotor 47. The stator may be non-rotatably fixed to the generator base 46, with the rotor 47 being rotatable relative to the stator 48 about the rotation axis 280. In one embodiment, the chain pulley 21, or input, has a first rotational speed and the generator 50, e.g, the rotor 47 or output, has a second rotational speed, wherein the generator transmission provides a ratio between the first and second rotation speeds of between and including 20:1 and 50:1. In one embodiment, the overall gear ratio of the transmission between the upper pulley 21 and the rotor 47 of the generator 50 is preferably 33.75:1 (e.g., overall gear ratio=(gear ratio 1)*(gear ratio 2)*(pulley ratio 3)=3*3*3.75=33.75:1, meaning the rotational speed of rotor 47 will be 33.75 times greater than the rotational speed of upper pulley 21. It should be understood that this ratio may be varied by changing any of the gear ratios between the spur gear 37 and the pinion gear 38, 338, the spur gear 39, 339 and the pinion gear 40, and the first pulley 41 and the second pulley 42.

In one embodiment, shown in FIGS. 30-33, the generator transmission 250 includes a clutch 290, which drivably connects the chain pulley 21 and the generator 50, and the rotor 47 in particular, when the chain pulley 21 is rotated in the first rotational direction such that the generator 50 is activated, meaning the rotor 47 is being rotated relative to the stator 48. The clutch 290 disconnects the chain pulley 21 and the generator 50 when the chain pulley 21 is rotated in the second rotational direction such that the generator 50 is deactivated, meaning the rotor 47 is not being rotated relative to the stator 48. In one embodiment, the clutch 290 is disposed between the spur gear 339 and the pinion gear 338. It should be understood that the clutch 290 may also be disposed between any coaxially mounted components, including for example between the chain pulley 21 and the spur gear 37, or the pinion gear 40 and the pulley 41. In other embodiments, the clutch may be disposed between non-coaxially mounted components, for example a slip interface between the adjacent pulleys. In one embodiment of the clutch, the pinion gear 338 defines a drive member, which is rotatably supported by the axle 44. It should be understood that the drive member may be a spur gear. In either case, the clutch 290 is disposed or mounted between the drive member, i.e., pinion gear 338, and a driven member, i.e., the spur gear 339. In this way, the clutch 290 provides for one-way rotational engagement between the drive member and the driven member. In one embodiment, the clutch 290 includes at least one spring finger 292, and preferably a plurality of spring fingers (shown as two). The driven member, or gear or pulley, may include in one embodiment a hub 294 having at least one indentation 296, and preferably a number of indentations 296 (e.g., 2) corresponding to the number of spring fingers 292, although the numbers may be different. The spring fingers 292, which are in-molded with the spur gear 339 in one embodiment, may be configured as cantilever leaf springs having a curved arm 302 extending from web of the spur gear 339 and terminating at an engagement end 304. The engagement end 304 is positioned radially inwardly from an inner bearing surface 306 of the driven gear, or spur gear 339, when the arm 302 is in a non-biased position, i.e., is not pre-loaded. The arm 302 is preloaded by moving the end 304 radially outwardly until it engages an outer bearing surface 310 of the hub 294, or shaft, of the pinion gear 338. The indentations 296 are formed and extend radially inwardly form the bearing surface 310. In one embodiment, the indentations include a ramped surface 298 tapering inwardly from and intersecting the bearing surface 310 and a stop surface 300 extending from and intersecting the ramped surface 298 toward and intersecting the bearing surface 310. The stop surface 300 is substantially orthogonal to a tangent of the bearing surface 310, and the intersection thereof, in one embodiment, although other angles may be suitable. The arm 302 biases the engagement end 304 into engagement with the indentation 296, and the surfaces 298 and 300 in particular, due to the preload. When the pinion gear 338 is rotated relative to the spur gear 339 in one direction, the arms 302, and the ends 304 thereof, will eventually engaged the stop surface 300 as the arm is biased radially inwardly and thereafter drive the driven gear, or spur gear 339 with the drive gear 338 as the chain wheel 21 is rotated in one rotation direction, i.e., a pedaling direction. When the user backpedals, the chain 4 and chain pulley 21 are rotated in an opposite rotational direction, with the ends of the arms 302 successively and intermittently sliding outwardly along the ramp 298 as the arms 302 are biased out of engagement and thereafter along the bearing surface 310, such that the drive gear, or pinion gear 338, does not rotate the driven gear, or spur gear 339. In this way, the spring fingers 292, or curved arm 302, is biased into engagement with the indentation 296, and the stop surface 300, when the chain pulley 21 is rotated in the first rotational direction, and wherein the spring fingers 292, or curved arm 302, is biased out of engagement with the indentation 296 by the ramped surface 298 and bearing surface 310 when the chain pulley 21 is rotated in the second rotational direction such that the generator 50 is deactivated, or not rotated.

Figure 14:
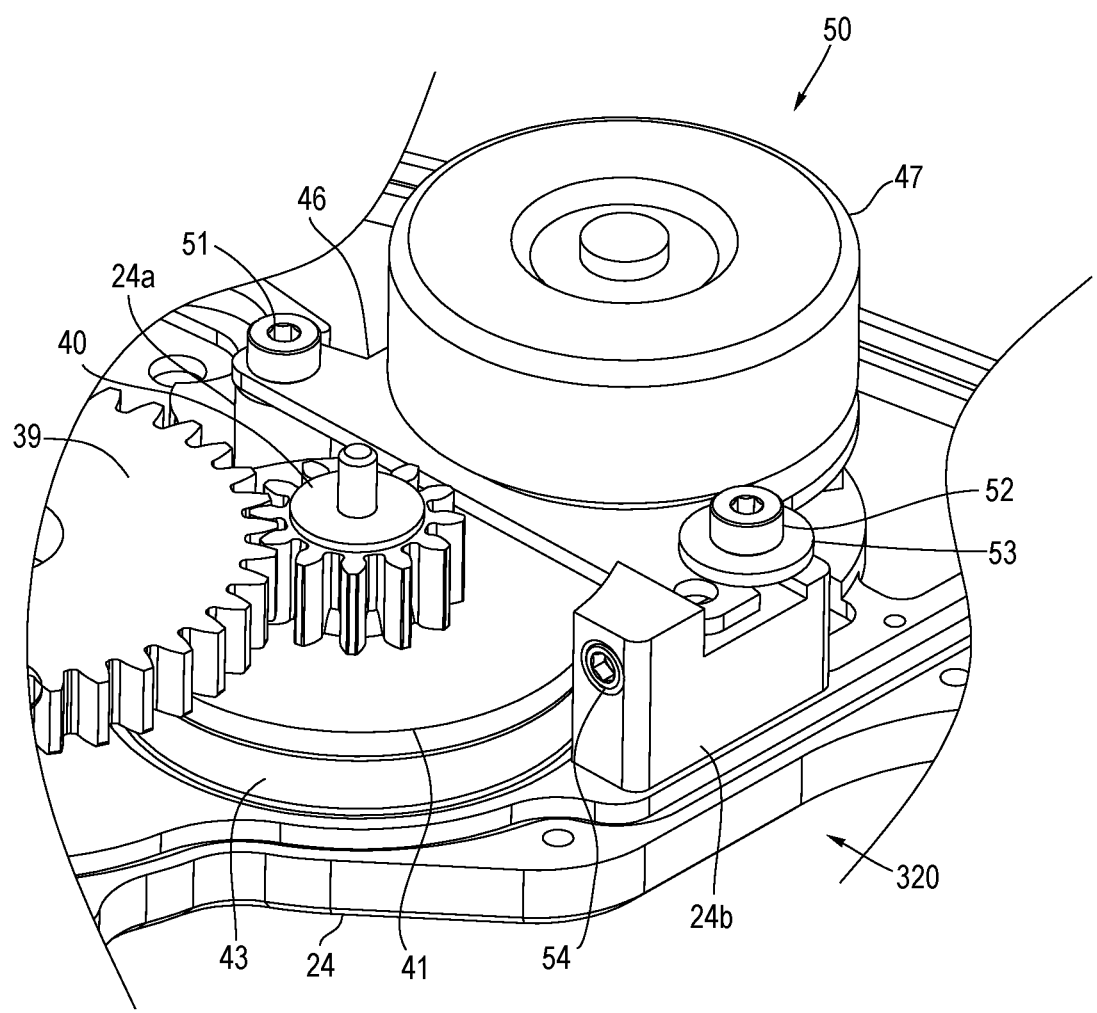
FIG. 14 is a perspective view of a belt tension adjustment system.
Figure 15:
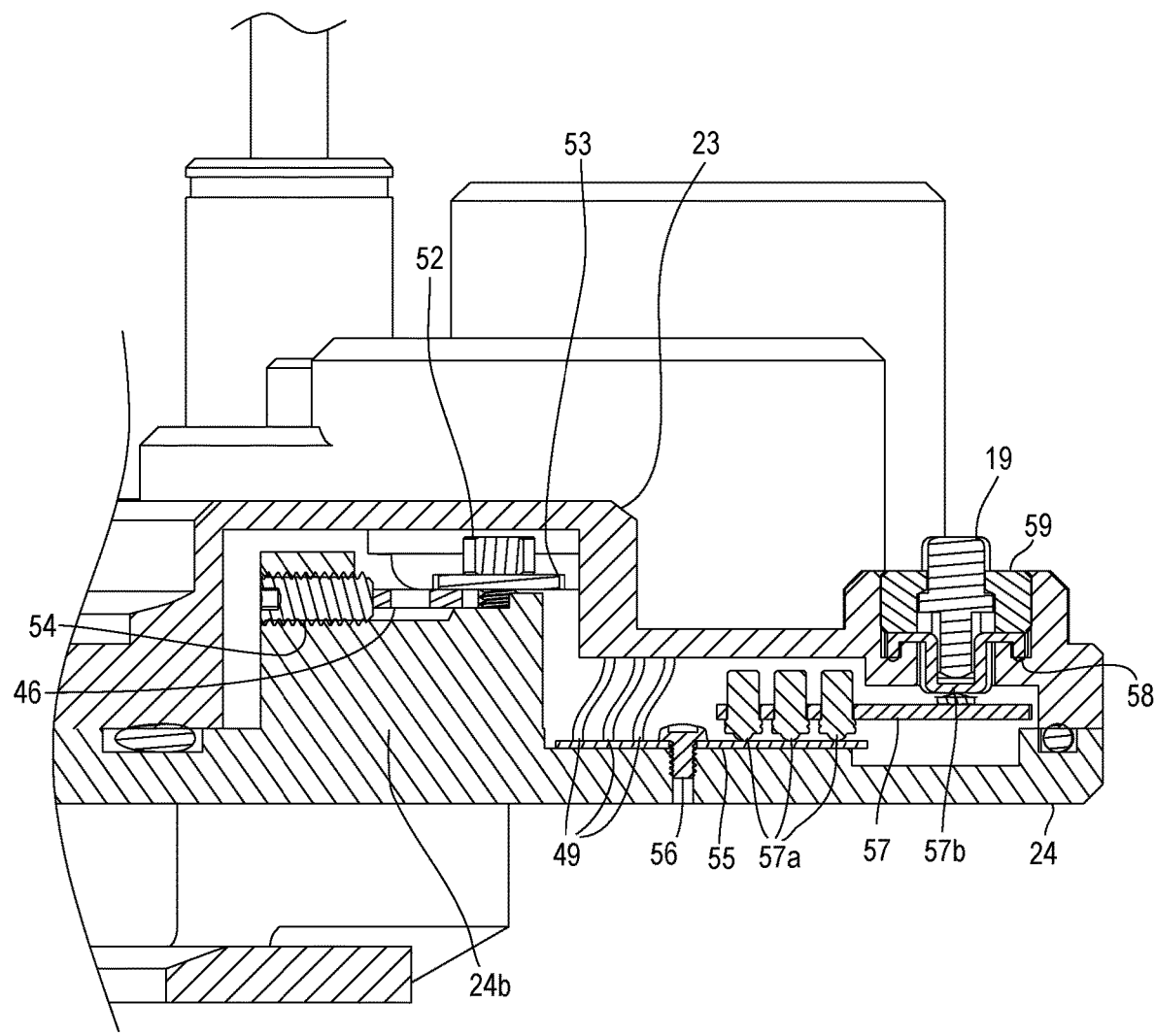
FIG. 15 is a cross-sectional view of the cage assembly taken along line 15-15 in FIG. 8.
Figure 31:
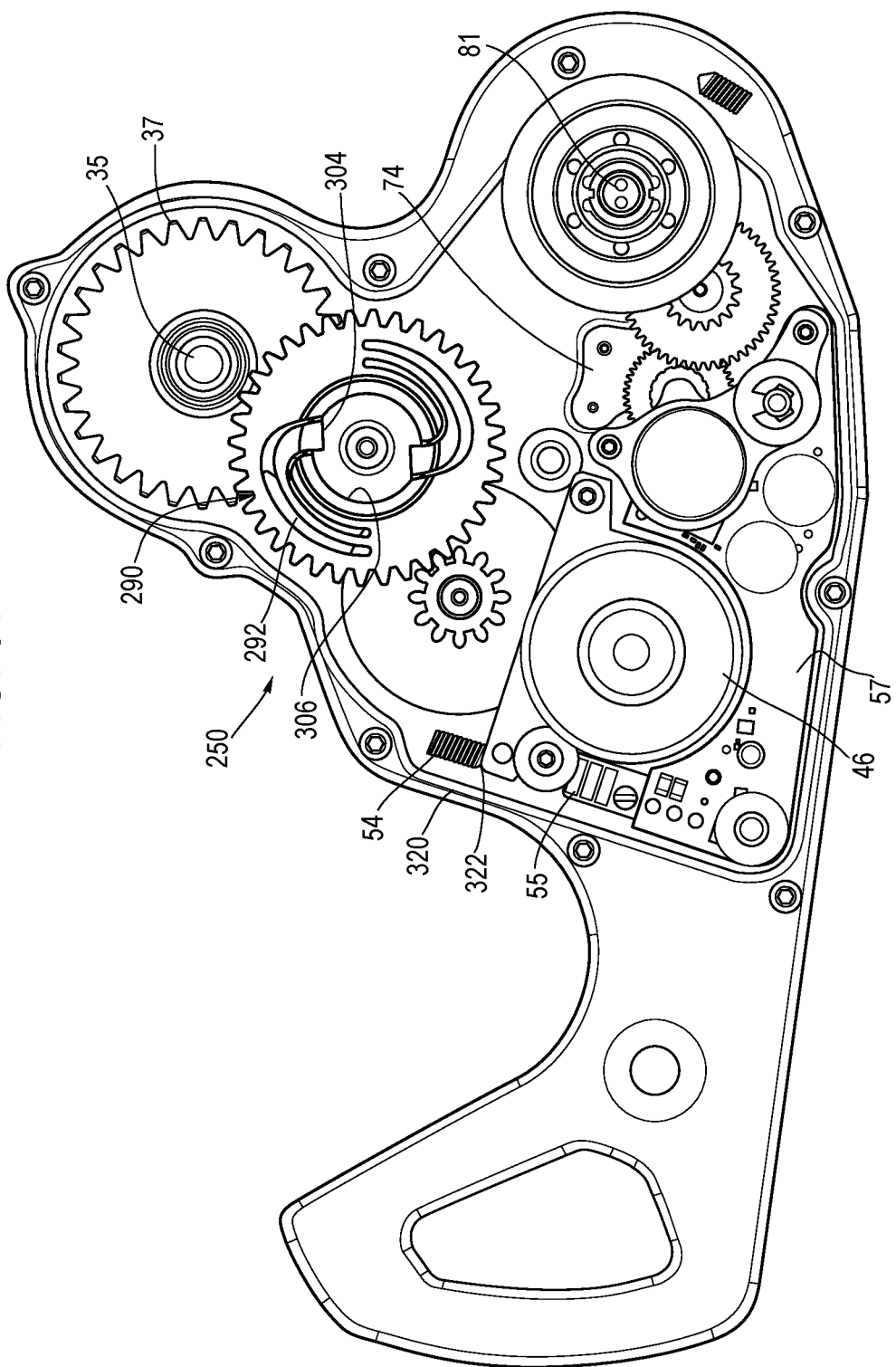
FIG. 31 is an opposite partial side view of the cage assembly shown in 30.
Figure 32:
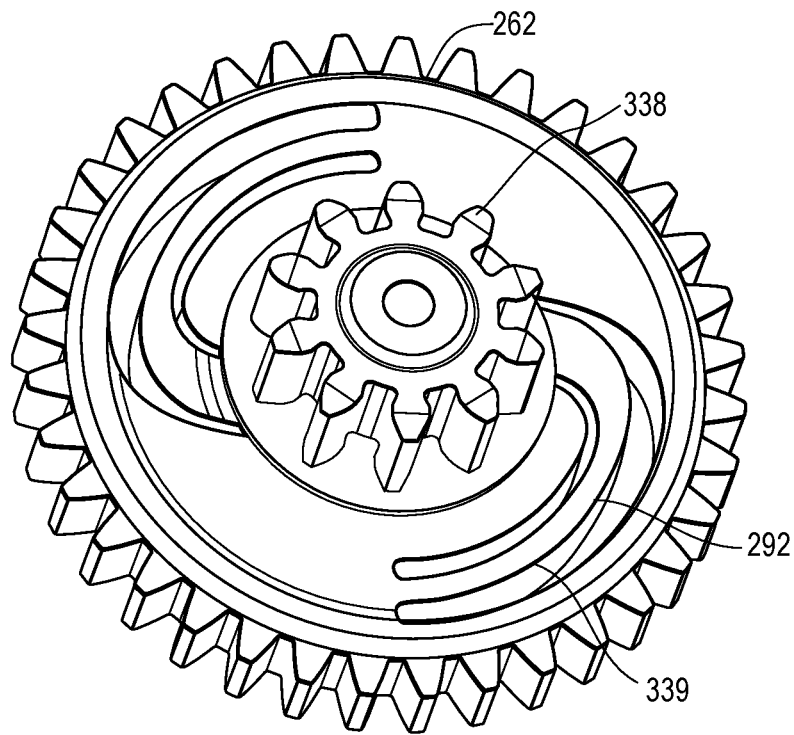
FIG. 32 is a perspective view of one embodiment of a gear configured with a clutch.
Figure 33:
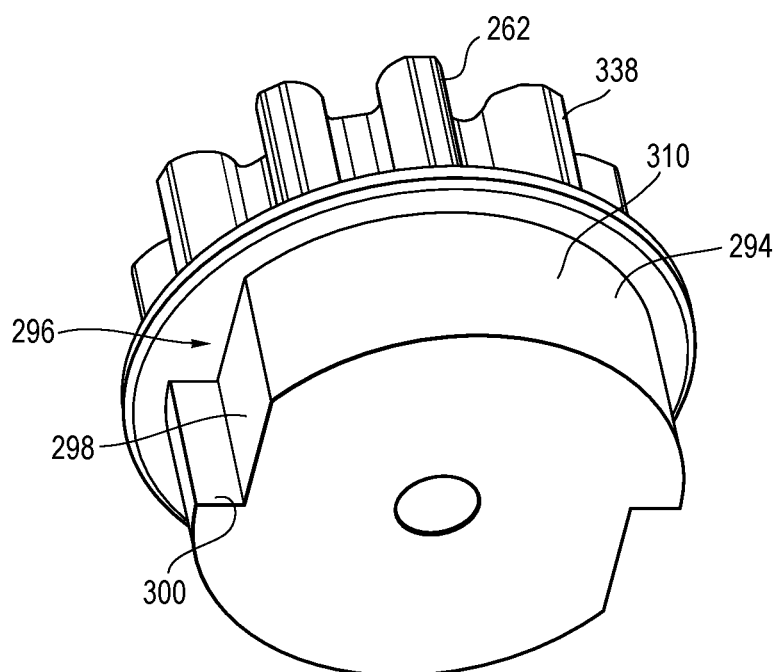
FIG. 33 is a perspective view of a drive member shown in FIG. 32 including a portion of the clutch.

Referring to FIGS. 14, 15 and 31, a belt tensioner 320 may be coupled to the cage assembly and is operable to adjust a tension of the belt 43. The belt tensioner 320 includes a first fastener 51, or first generator screw, which is threadably engaged with a first boss 24a formed on the outer cage 24, and a second fastener 52, or second generator screw, which is threadably engaged with a second boss 24b formed on the outer cage 24. The first fastener 51 passes through an opening in the generator base 46, and the second fastener 52 passes through a washer 53 overlapping an edge of the generator base 46. The belt tensioner 320 further includes a belt tension adjustment member 54 that acts between the outer cage 24 and the generator 50, and the base 46 in particular. In one embodiment, the adjustment member 54 may be configured as a set screw, which is threadably received in a boss 24b formed in the outer cage 24. An end 322 of the adjustment member 54 abuts the generator base 46, for example an edge thereof. In operation, and in order to adjust the tension of the belt 43, the fasteners 51, 52 are left slightly loose. The adjustment member 54 may then be actuated, for example by threadably engaging the upper boss 24b, such that the adjustment member 54 pushes on the edge of generator base 46 against a biasing force or tension of the belt 43. The base 46 may rotate slightly around the fastener 51, creating more tension in the belt 43. When the desired belt tension has been reached, the fasteners 51, 52 may be tightened, thus fixing the belt tension at the desired level. The adjustment member 54 may be provided with an anti-loosening device, for example a nylon patch to prevent loosening of the adjustment member 54 over time.

Figure 19:
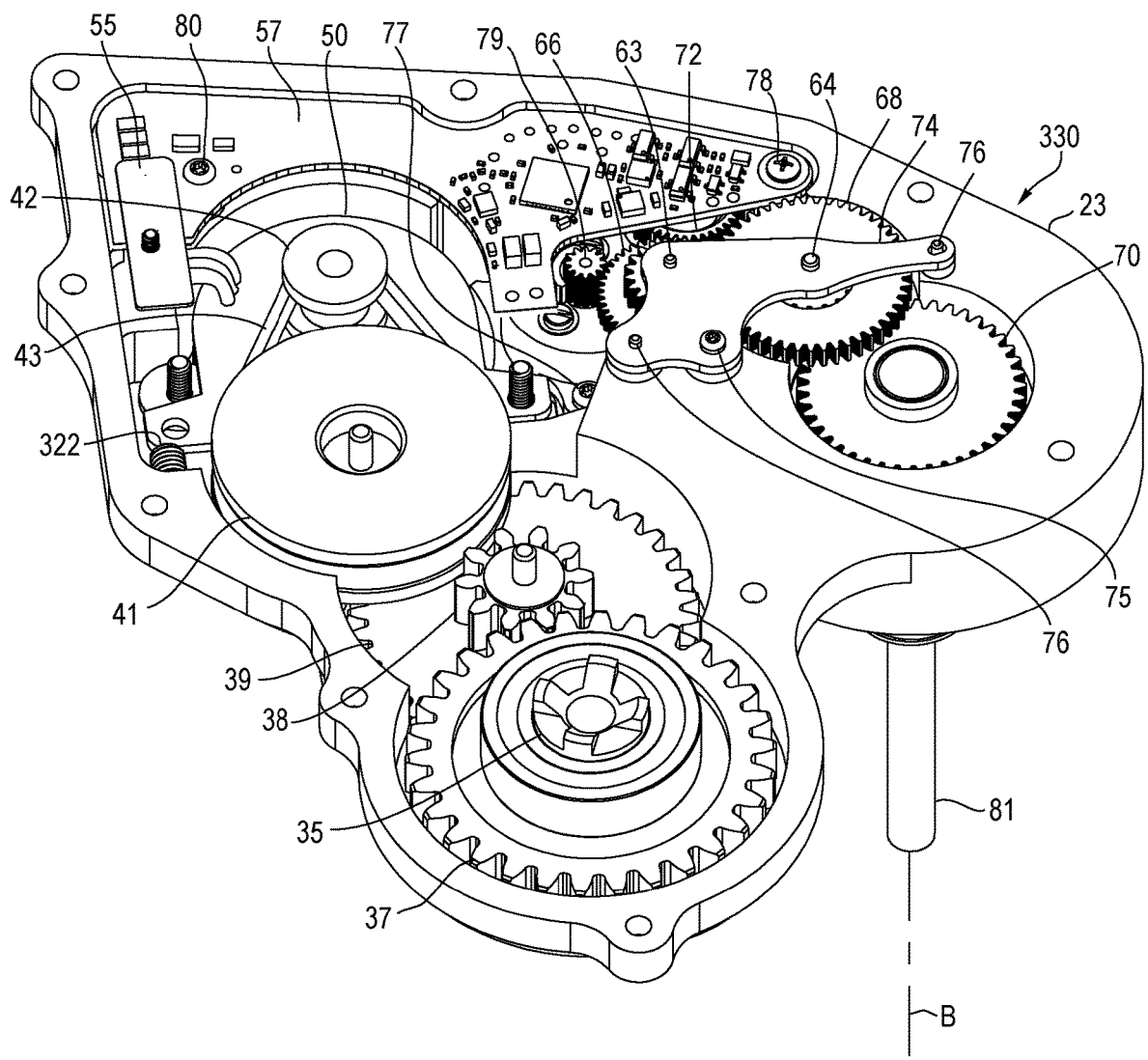
FIG. 19 is a partial side perspective view of a cage assembly with a cover removed.

Referring to FIGS. 15 and 19, a plurality of generator wires 49, shown as three, extend from the stator 48 of the generator. The generator wires 49 are electrically connected to a generator printed circuit board (generator PCB) 55, which is mounted to the housing 200. In one embodiment, the generator PCB 55 is secured to the outer cage 24 with a screw 56, although the PCB 55 may be secured with adhesives, a snap fit or other suitable fasteners. The PCB 55 may alternatively be secured to the cover 23.

Figure 16:
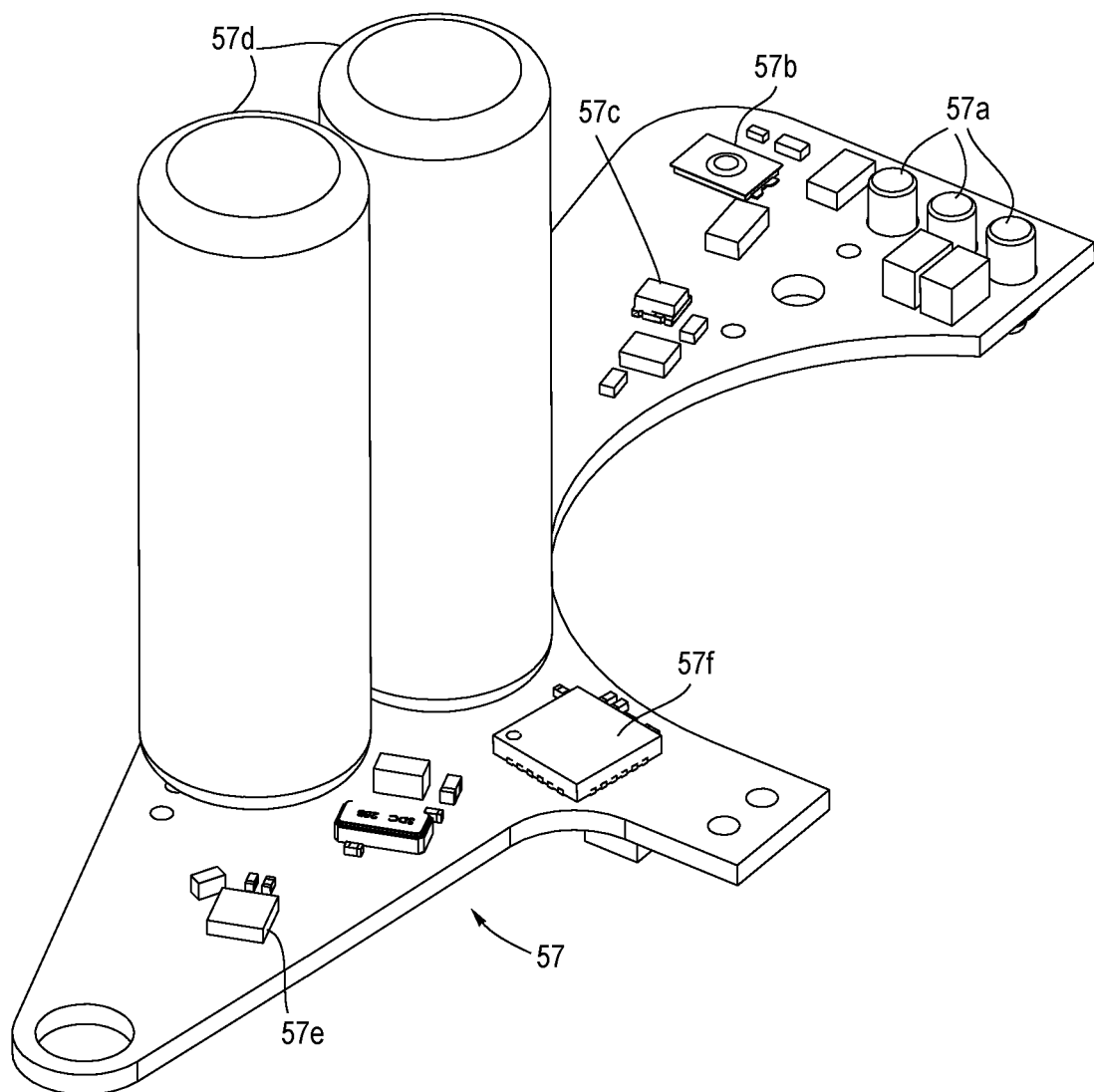
FIG. 16 is a perspective view of a main printed circuit board.

Referring to FIGS. 15, 16, and 19, a main printed circuit board (main PCB) 57 is fixed relative to housing 200, for example the cover 23, by a first mounting screw 80 and a second motor holder mounting screw 78. Referring to FIG. 16, the main PCB 57 includes various electronic components, including but not limited to a power storage device 57d, configured in one embodiment as supercapacitors, a motor driver 57f, an encoder 57e, a switch 57b, an LED 57c, a plurality of pogo pins 57a, and a microcontroller 402. Referring to FIG. 15, the pogo pins 57a of the main PCB 57 are in electrical contact with the generator PCB 55. The energy storage device 57d, e.g., supercapacitors, also is coupled to and moveable with the cage assembly 9, and in particular is secured to the main PCB 57. The generator 50 generates energy which is transmitted to and stored in the energy storage device 57d. In one embodiment, the energy storage device 57d includes at least one capacitor, shown as two supercapacitors. In other embodiments, the energy storage device may include one or more batteries, for example rechargeable batteries.

Figure 4:
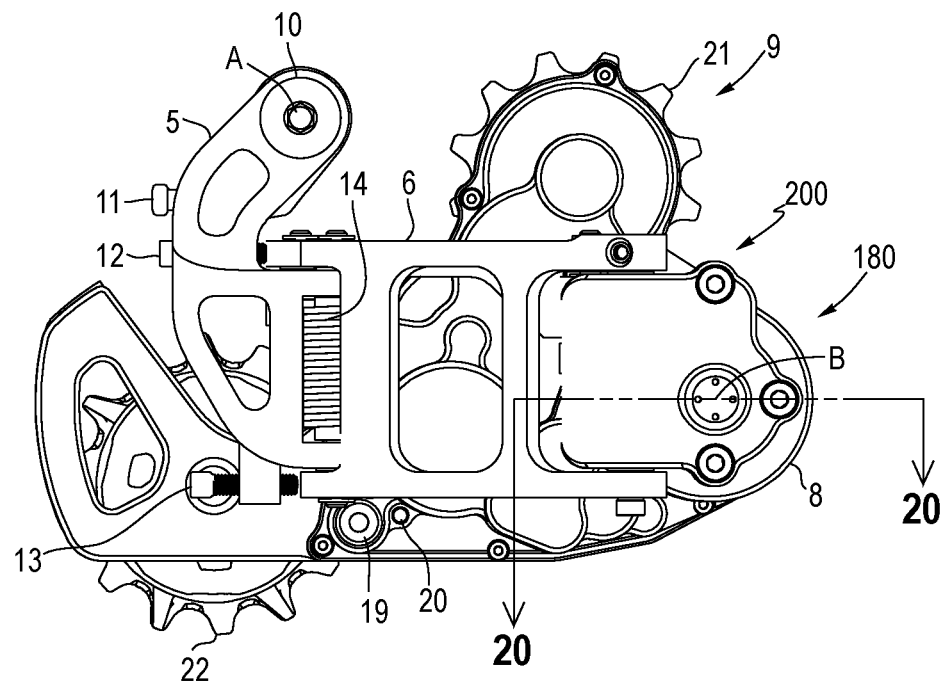
FIG. 4 is an outboard side view of one embodiment of a rear derailleur having a cage assembly in a fully rotated clockwise position.
Figure 5:
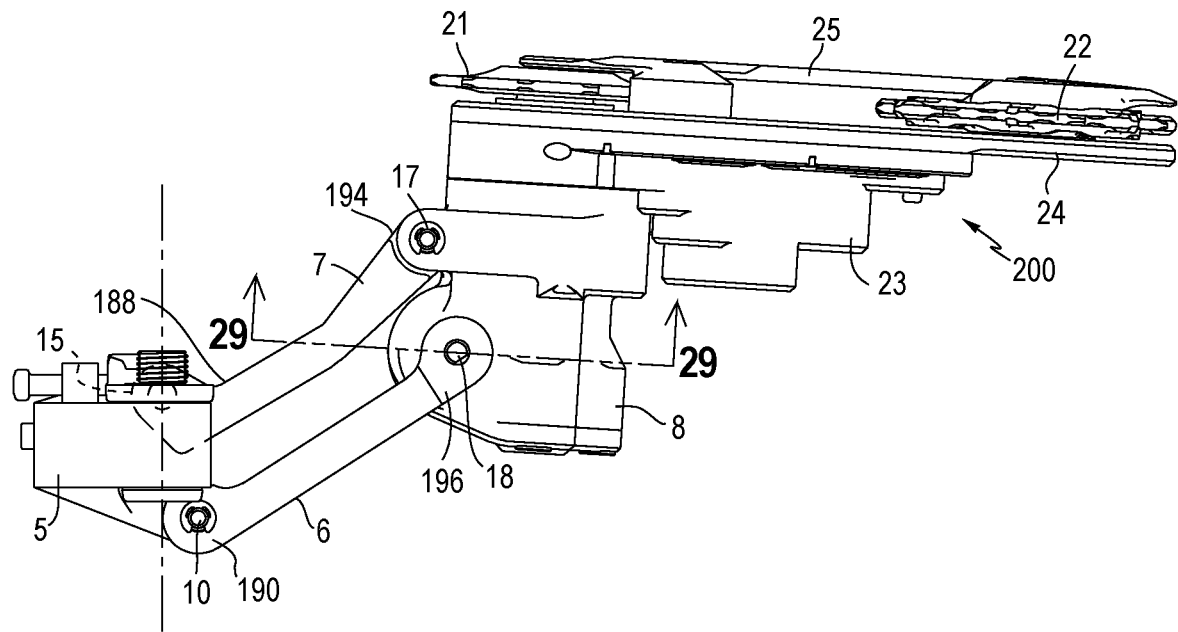
FIG. 5 is a top view of a rear derailleur in an extreme inboard position.
Figure 6:
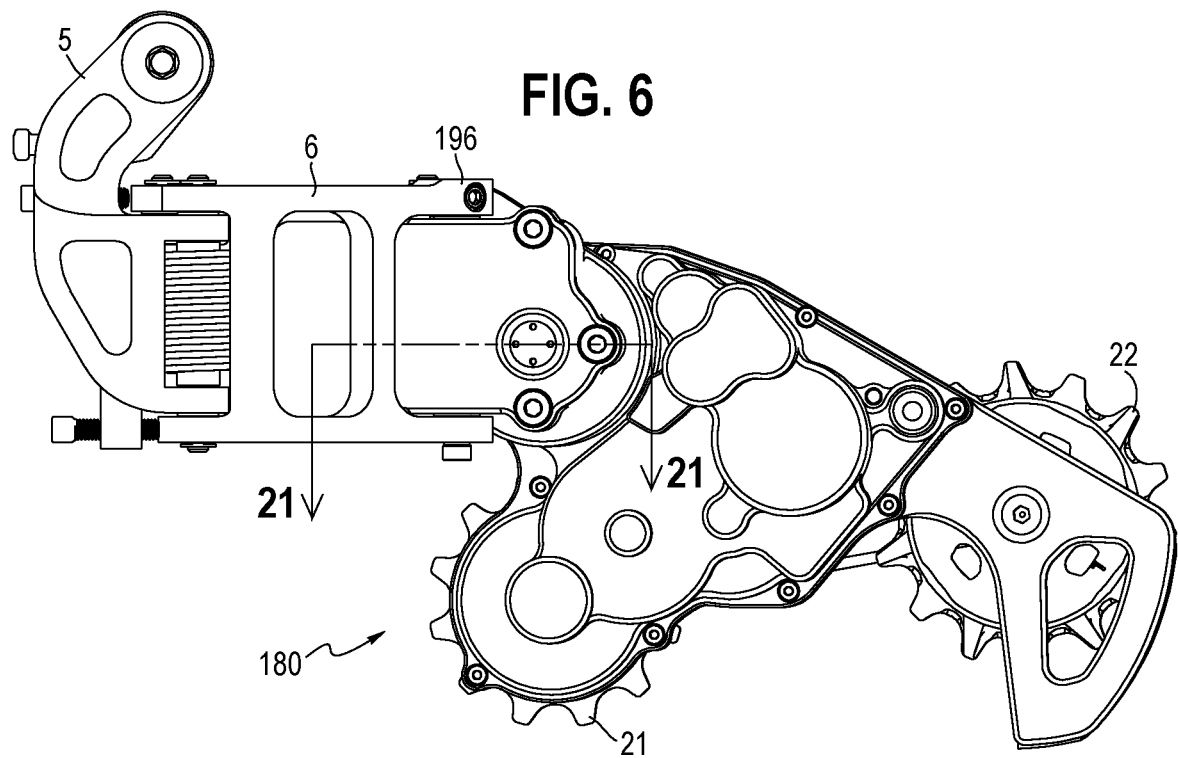
FIG. 6 is an outboard side view of one embodiment of a rear derailleur having a cage assembly in a fully rotated counterclockwise position.

Referring to FIGS. 4, 8 and 15, a function button 19 is coupled to the housing 200, and cover 23 in particular, by a button retainer 59. An elastomeric seal 58 is disposed between the button retainer 59 and a surface of the cover 23, or housing 200. When the function button 19 is pressed by the user, the button 19 actuates the switch 57b of the main PCB 57. Among other functions, the function button 19 may be used to wirelessly pair the derailleur 180 with other system components, such as shifters that may located remotely on the handle bars, for example. A LED lens 20 may be a clear lens that is fixed in a hole in the cover 23 or cage 24, i.e. housing 200. The LED lens 20 is positioned such that LED 57c of the main PCB 57 shines through the lens 20 and is visible to the user. The LED 57c may be used to indicate a state of the system. For example and without limitation, the LED 57c is used when wirelessly pairing derailleur 180 with other system components, such as the shifters. The LED 57c also may also be used to indicate other system states, such as battery life, for example.

Figure 17:
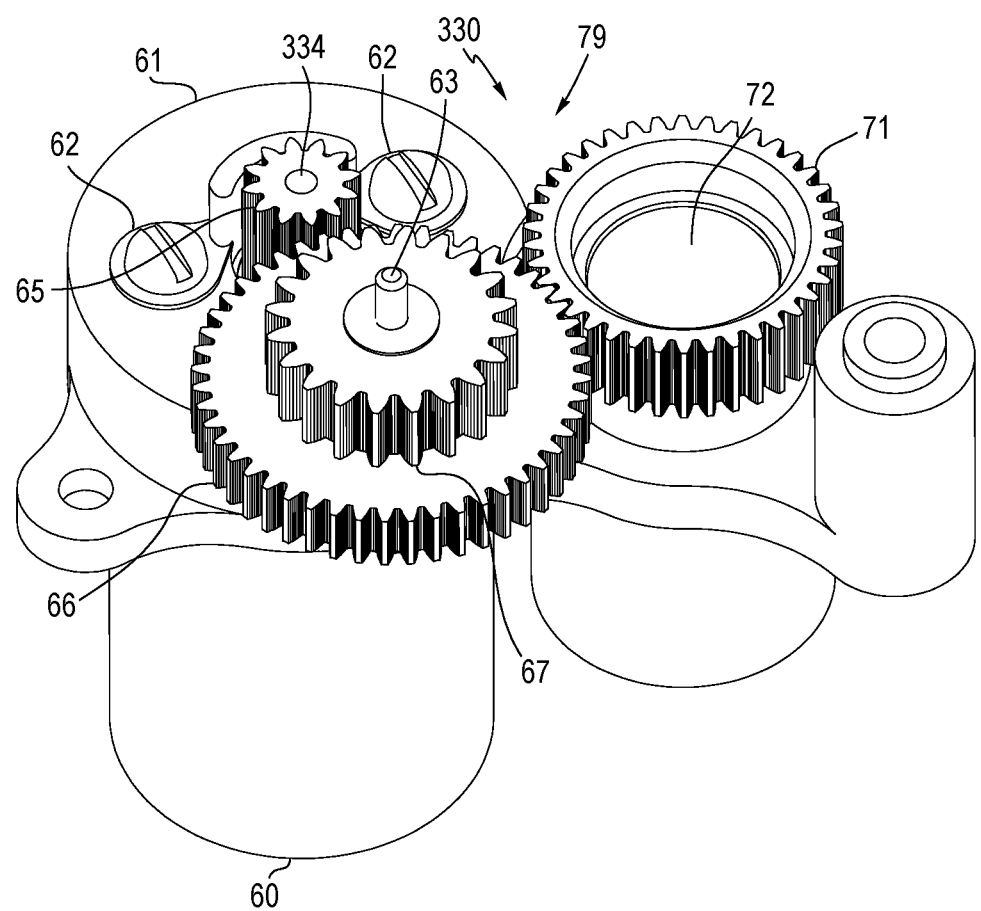
FIG. 17 is a perspective view of a motor and shifting drive system.
Figure 18:
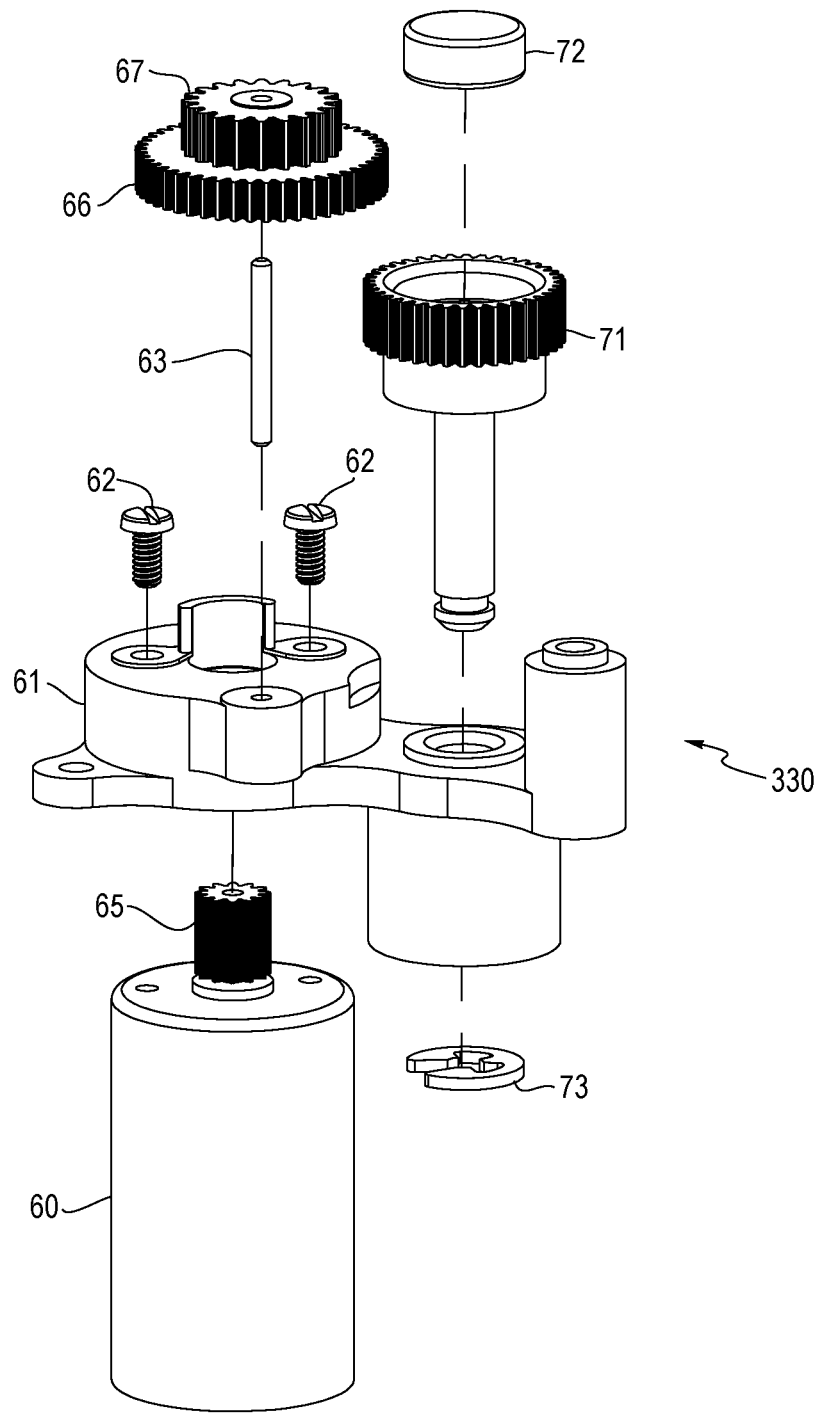
FIG. 18 is an exploded view of the motor and shifting drive system shown in FIG. 17.

Motor and Shifting Drive System:

FIGS. 17 and 18 depict a motor holder assembly 79, including a motor 60, which is coupled to and moveable with the cage assembly 9 in the opposite first and second directions. The motor 60 is operable to move the cage assembly 9 in the opposite first and second directions relative to the base member 5 and frame 2, for example inboard and outboard lateral directions. A shifting drive system 330 is coupled between the motor 60 and the linkage 186, wherein the shifting drive system includes an input from the motor 60 and an output coupled to the linkage 186.

The motor 60, for example a DC motor, includes a first drive pinion gear 65 fixed to an output shaft 334, which defines the input for the shifting drive system. The motor 60 is fixed to the motor holder 61 by at least one fastener 62, for example a pair of screws. One end of a first drive axle 63 is received in a hole in motor holder 61. A first drive spur gear 66 is coaxially fixed to a second drive pinion gear 67, having a plurality of teeth (e.g., twenty (20)), and together the first drive spur gear 66 and the second drive pinion gear 67 rotate around the first drive axle 63. The first drive pinion gear 65 has a plurality of teeth, e.g., twelve (12), spaced circumferentially around a periphery of the pinion gear that are engaged with a plurality of teeth (e.g., forth-eight (48)) spaced circumferentially around a periphery of a first drive spur gear 66, providing a gear ratio of 4:1. An encoder gear 71, having a plurality of teeth (e.g., thirty eight (38)), has a cylindrical recess in which an encoder magnet 72 is received. The encoder magnet 72 is fixed relative to encoder gear 71. The encoder gear 71 has a long, cylindrical end portion that is rotatably received in a hole in motor holder 61. The encoder gear 71 is engaged with the first drive spur gear 66, and is axially retained by a retaining clip 73. Referring to FIG. 19, the motor holder assembly 79 is fixed to the cover 23 or outer cage 24, i.e., housing 200, with one or more fasteners, for example a first motor holder mounting screw 77 and a second motor holder mounting screw 78. The encoder magnet 72 is positioned adjacent to encoder 57e of the main PCB 57. Electrical wires electrically connect the motor 60 to the main PCB 57.

Referring to FIG. 19, the shifting drive system 330 includes a gear support plate 74 positioned relative to housing 200 by two positioning pins 76 that protrude from the cover 23, and are retained by a screw 75. The gear support plate 74 supports an end of the previously described first drive axle 63. A second drive axle 64 has a first end that is received in an opening in the cover 23, and a second end that is supported by the gear support plate 74. A second drive spur gear 68 is coaxially fixed to a third drive pinion gear, with these two gears rotating together as a unit around the second drive axle 64. The second drive spur gear 68 has a plurality of teeth (e.g., 48) that are engaged with a plurality of teeth (e.g., 20) on the second drive pinion gear 67, providing a gear ratio of 2.4:1. A third spur gear 70, having a plurality of teeth (e.g., 42), is engaged with the third drive pinion gear, having a plurality of teeth (e.g., 18), providing a gear ratio of 2.33:1. The shifting drive system has an overall gear ratio of 4*2.4*2.33=22.4:1 in one embodiment, although other gear ratios may be suitable.

Figure 20:
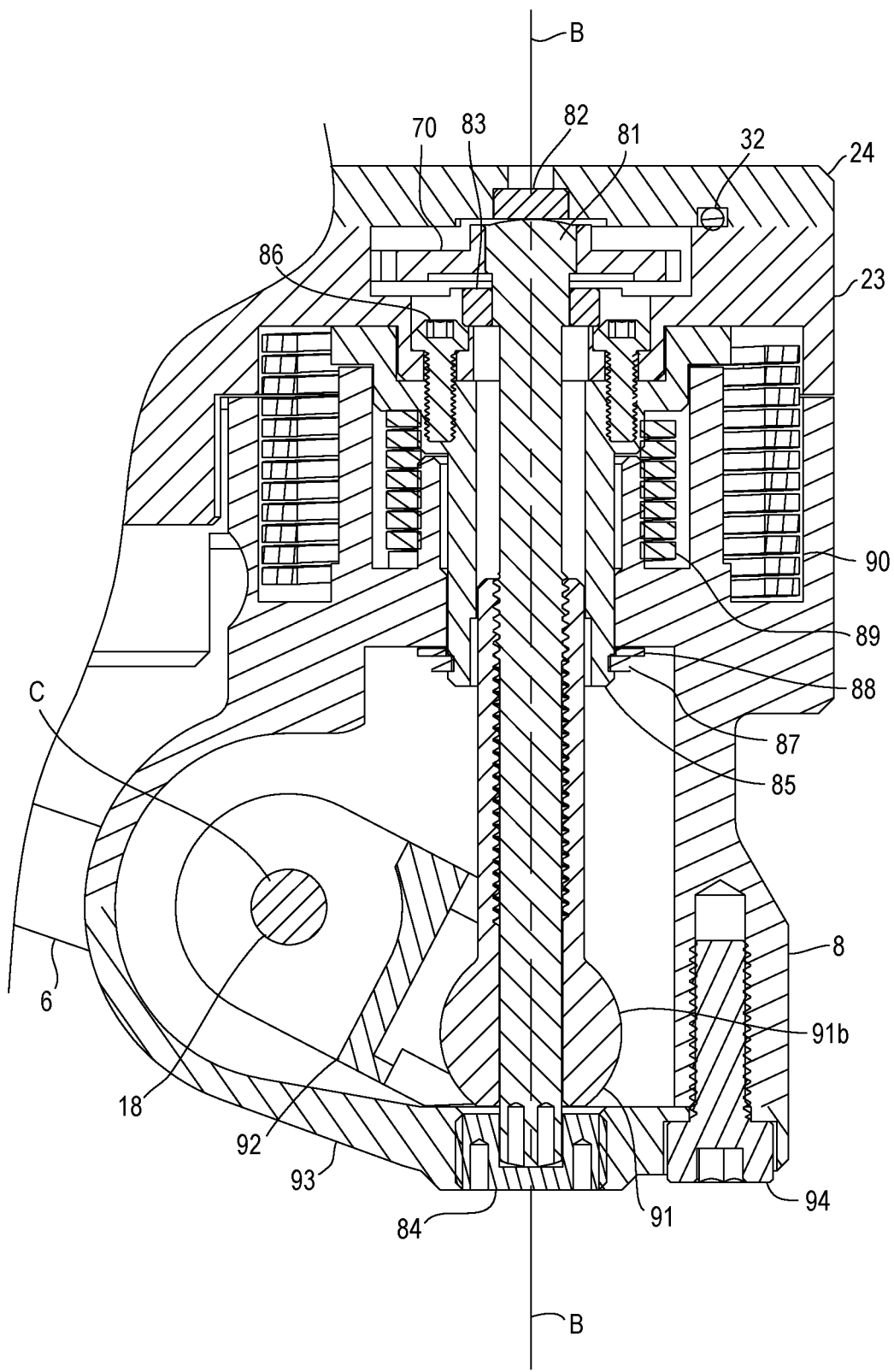
FIG. 20 is a cross-sectional view of the derailleur taken along line 20-20 in FIG. 4.
Figure 24:
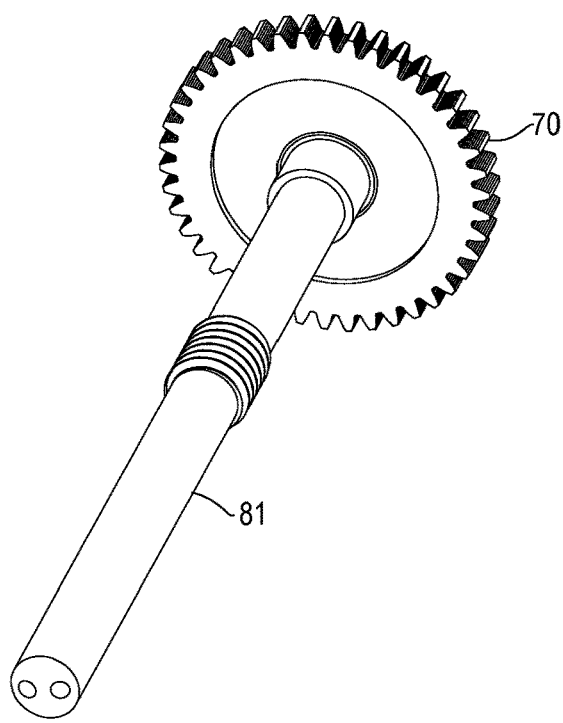
FIG. 24 is a perspective view of a lead screw and spur gear.
Figure 25:
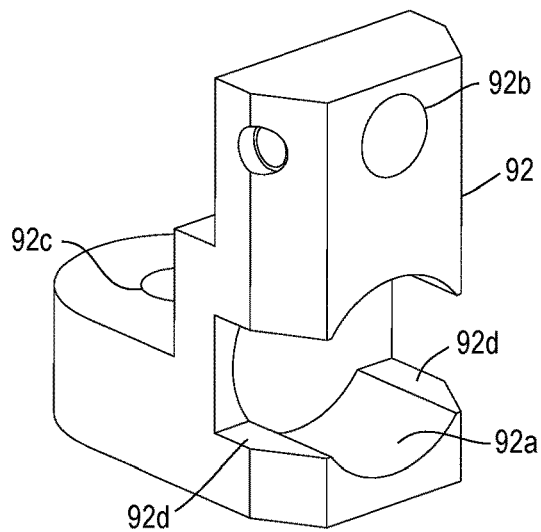
FIG. 25 is a perspective view of a crank arm.
Figure 26:
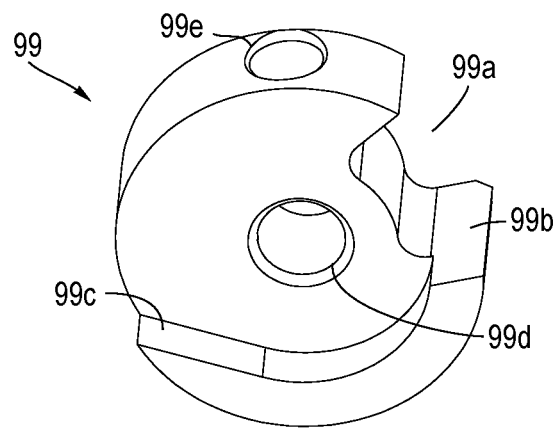
FIG. 26 is a perspective view of a drive element.

Referring to FIGS. 19, 20 and 24, the shifting drive system 330 has an output with a second rotational speed that is less than the first rotational speed of an input, or the motor 60 and the shaft 334, as determined by the overall gear ratio. In one embodiment, the output is configured as a lead screw 81, which is coaxially fixed to the third spur gear 70. The lead screw 81 is rotatable in first and second opposite rotation directions, and is threadably engaged with a crank arm 92. The crank arm 92 is moveable in opposite first and second axial directions in response to the rotation of the lead screw 81 in the opposite first and second rotation directions. As further explained below, the crank arm 92 is coupled to the linkage 186. In one embodiment, the lead screw 81 is partially threaded along its length. A lead screw bearing 83 is received in a recess formed in the cover 23, or housing 200. An adjustable bearing 84 is threadably received in the moveable member cover 93, which is fixed to the moveable member 8 with fasteners, shown as three screws 94. The lead screw 81 is radially supported by a lead screw bearing 83 near a first end and is radially supported by an adjustable bearing 84 at a second end. Axial thrust loads of the lead screw 81 are reacted in a first direction by a thrust element 82 that is received in a recess in the outer cage 24, and are reacted in a second direction by a surface of the adjustable bearing 84. The adjustable bearing 84 may be threaded into the moveable member cover 93 to substantially eliminate any axial "play" of the lead screw 81. Preferably, the adjustable bearing 84 includes a nylon locking element on its threaded portion to prevent it from moving after it has been set in the desired position.

Figure 21:
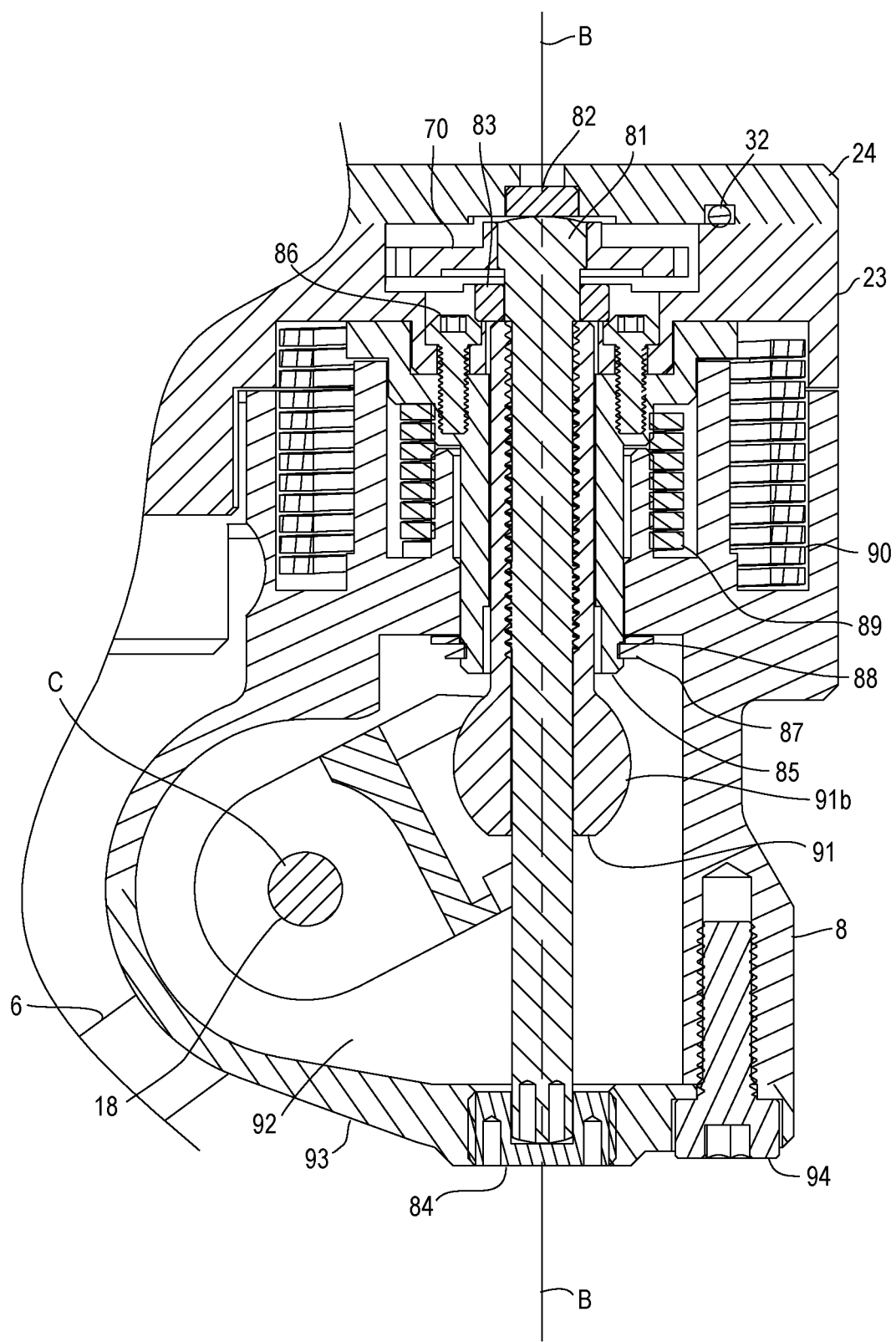
FIG. 21 is a cross-sectional view of the derailleur taken along line 21-21 in FIG. 6.
Figure 22:
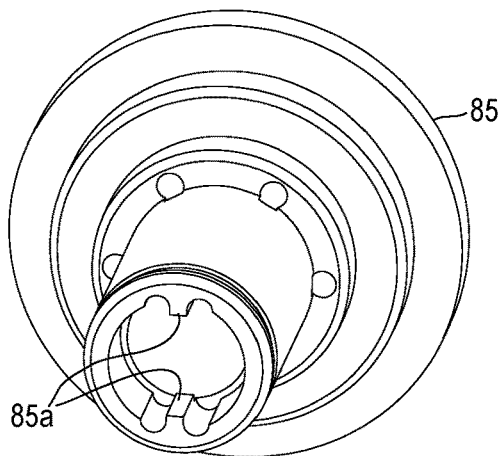
FIG. 22 is a perspective view of a cage shaft.

Referring to FIGS. 7 and 20-22, a cage shaft 85 is fixed to the cover 23 and housing 200 with fasteners, for example six screws 86. Alternatively, the cage shaft 85 may be fixed to the cover 23 by an over-molding process or by other means. Referring to FIG. 22, the cage shaft 85 has two keying features 85a that protrude radially inward from an inner diameter of cage shaft 85. The cage shaft 85 is rotatably received in a hole in the moveable member 8 coaxial with the axis B and is axially retained to the moveable member 8 by a retaining ring 87. A thrust washer 88 is disposed between the retaining ring 87 and a surface of the moveable member 8. Alternatively, the thrust washer 88 may be replaced by shims of variable thickness that can be used to substantially eliminate any axial play between the cage shaft 85 and the moveable member 8.

Figure 23:
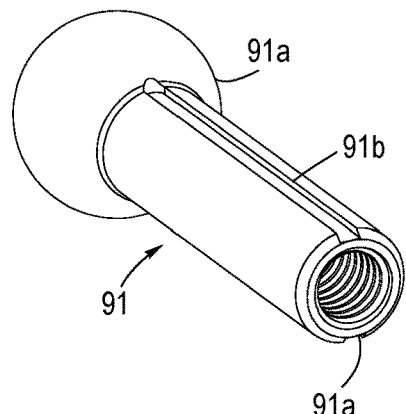
FIG. 23 is a perspective view of a lead nut.

Referring to FIGS. 20, 21, and 23, a lead nut 91 has a threaded internal diameter and a first end 91b having a spherical shape. Keyways 91a are formed as grooves along the length of an outer diameter of lead nut 91. Threads of the lead nut 91 are threadably engaged with threads of the lead screw 81, and keying features 85a of the cage shaft 85 are slidably received in keyways 91a of the lead nut 91. Rotation of the lead nut 91 relative to the cage shaft 85 is prevented by the key and keyway arrangement. Therefore, rotation of lead screw 81 causes translation of the lead nut 91 along axis B.

Referring to FIGS. 20-21, 25, 26 and 27, the crank arm 92 has a cylindrical recess 92a, a first hole 92b and a second hole 92c. The crank arm 92 is rotatably connected to a fourth pin 18 at the second hole 92c. The spherical end 91b of lead nut 91 is engaged with the cylindrical recess 92a of the crank arm 92. The crank arm 92 includes a slot 92d, which cuts through cylindrical recess 92a and provides clearance for the elongated cylindrical portion of the lead nut 91 and lead screw 81. Thus, contact between the lead nut 91 and crank arm 92 is maintained between the spherical portion 91b of the lead nut 91 and the cylindrical recess 92a of the crank arm 92, which is preferably the only contact between those components in one embodiment.

Referring to FIGS. 26-29, a fourth pin 18 passes through a hole 99d of a drive element 99. In one embodiment, the drive element 99 may be fixed to the fourth pin 18 by a set screw 100 that is threadably engaged with a threaded hole 99e of the drive element 99 and engages a flat surface 18a formed on the fourth pin 18. A drive pin 97 is received in the hole 92b of the crank arm 92 and is fixed to the crank arm 92 by a set screw 104. The drive pin 97 extends into a recess 99a of the drive element 99. A saver spring sleeve 96 is a cylindrical sleeve co-axially located relative to the fourth pin 18. A saver spring 95 is a torsion spring that is located co-axially with the saver spring sleeve 96. A first end of the saver spring 95 engages the crank arm 92, and a second end of the saver spring 95 engages the surface 99c of the drive element 99. The saver spring 95 biases a surface 99b of the drive element 99 against the drive pin 97 in the clockwise direction around an axis (C) shown in FIG. 20.

Figure 27:
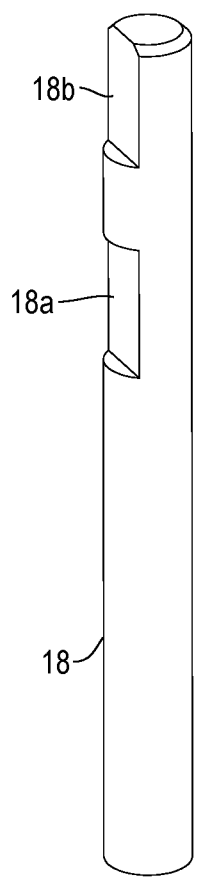
FIG. 27 is a perspective view of a pin.
Figure 28:
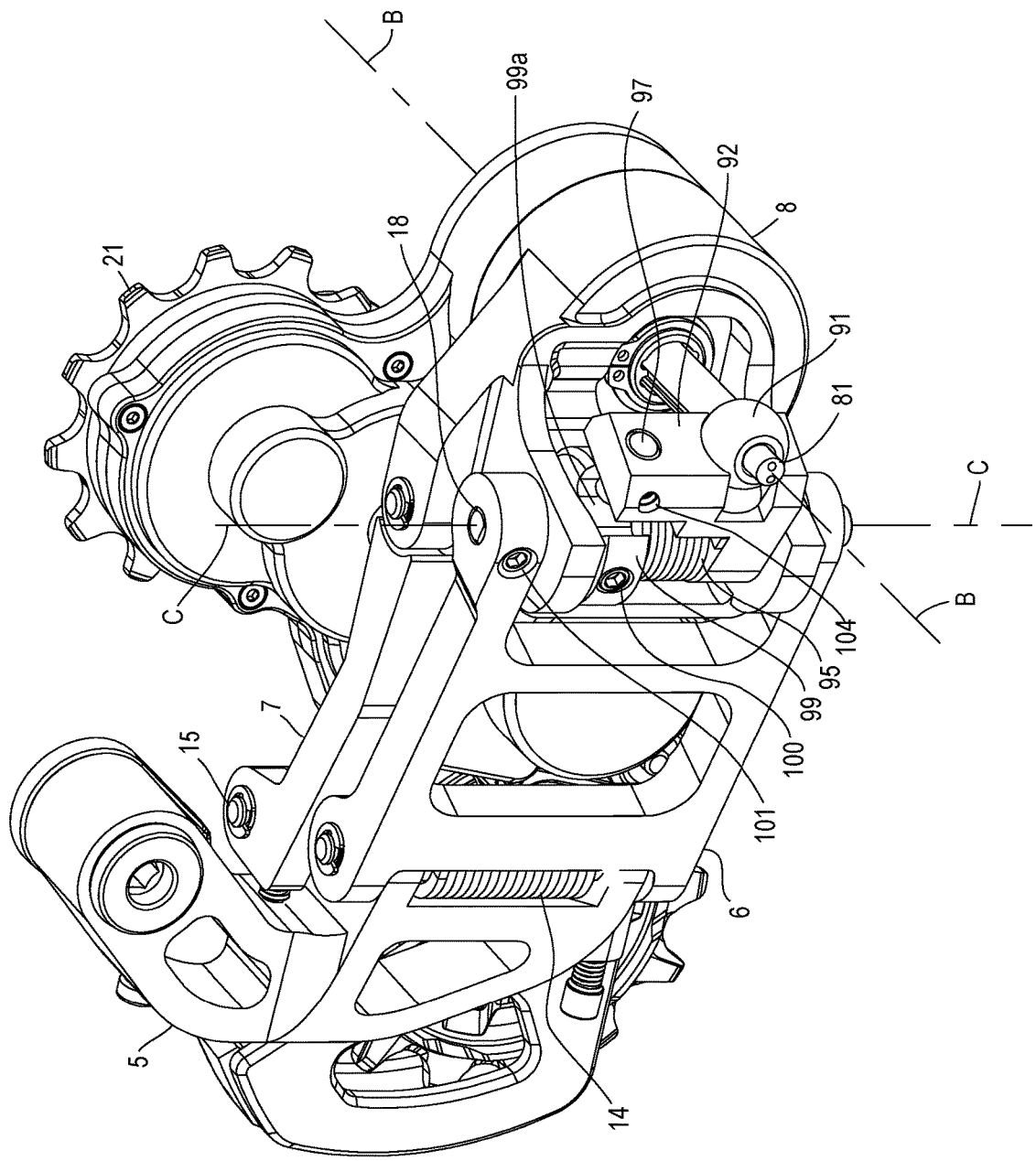
FIG. 28 is a perspective view of a derailleur with a portion of a moveable member cut-away.

Referring to FIGS. 27-29, the outer link 6 is fixed to the fourth pin 18 with a fastener, for example a set screw 101, which engages a flat 18b formed on the fourth pin 18.

Referring to FIG. 29, a fastener 102, for example a screw, is threadably engaged with an end of the fourth pin 18. Prior to engaging the drive element 99 with the drive pin 97 disposed in the recess 99a of drive element 99, the saver spring 95 is in a "free," or relaxed state. A tool, such as a screwdriver bit, may be engaged with the fastener 102, e.g., by inserting the tool into a screw, and thereafter actuated to rotate the fourth pin 18 counterclockwise as shown in FIG. around the axis (C). Since the fourth pin 18 is fixed to the drive element 99, the drive element (99) is rotated with the pin 18. The surface 99c of the drive element 99 biases or pushes an end of the saver spring 95, so as to load or wind up the saver spring 95 from a "free", or relaxed, state to a preloaded state. The drive pin 97 may thereafter be slid into engagement with the recess 99a of the drive element 99. The tool may be removed, with the biasing force of the saver spring 95 biasing the surface 99b of the drive element 99 clockwise around the axis (C) against the drive pin 97.

Referring to FIG. 20, a cage spring 90 is formed as a torsion spring, a first end of which is disposed in a recess formed in the moveable member 8 and is engaged therewith. A second end of the spring 90 is engaged with the cover 23, and is disposed in a recess in the cover 23. The cage spring 90 is arranged to rotationally bias the cage assembly 9 in the clockwise direction around axis (B) as shown in FIG. 1 to take up any slack in the chain 4.

Again referring to FIG. 20, a clutch spring 89 is shown as having a plurality of coils, for example in one embodiment with seven coils. The inner diameter of the a first plurality of coils, e.g., approximately the first five coils, is wrapped around a cylindrical surface of the moveable member 8. The inner diameter of a second plurality of coils, or a single auxiliary coil, is wrapped around a cylindrical surface of the cage shaft 85, with the first plurality of coils being greater than the second plurality (or auxiliary) coils. Because a greater number of coils is wrapped around the moveable member 8, any relative rotation between the cage shaft 85 and the moveable member 8 may cause slippage between the clutch spring 89 and the cage shaft 85, while the moveable member 8 and the clutch spring 89 remain fixed to each other. The clutch spring 89 is wound such that when the cage shaft 85, together with the cage assembly 9, rotates in the counterclockwise direction around axis (B), the resulting drag of the cage shaft 85 slipping against the clutch spring 89 causes the coils of the clutch spring 89 to tighten against the cylindrical surface of cage shaft 85, which acts to increase friction and dampen the rotation of cage assembly 9. When the cage shaft 85, along with the cage assembly 9, rotates in the clockwise direction around axis (B), the resulting drag of the cage shaft 85 against the clutch spring 89 causes the coils of the clutch spring 89 to loosen against the cylindrical surface of cage shaft 85, which acts to reduce friction and allow the cage assembly 9 to rotate more easily. The function of the clutch spring 89 is to resist undesired (counterclockwise around axis (B)) rotation of the cage assembly 9, which may allow the chain 4 to become slack, for example when the bicycle is traveling over rough terrain.

Figure 1:
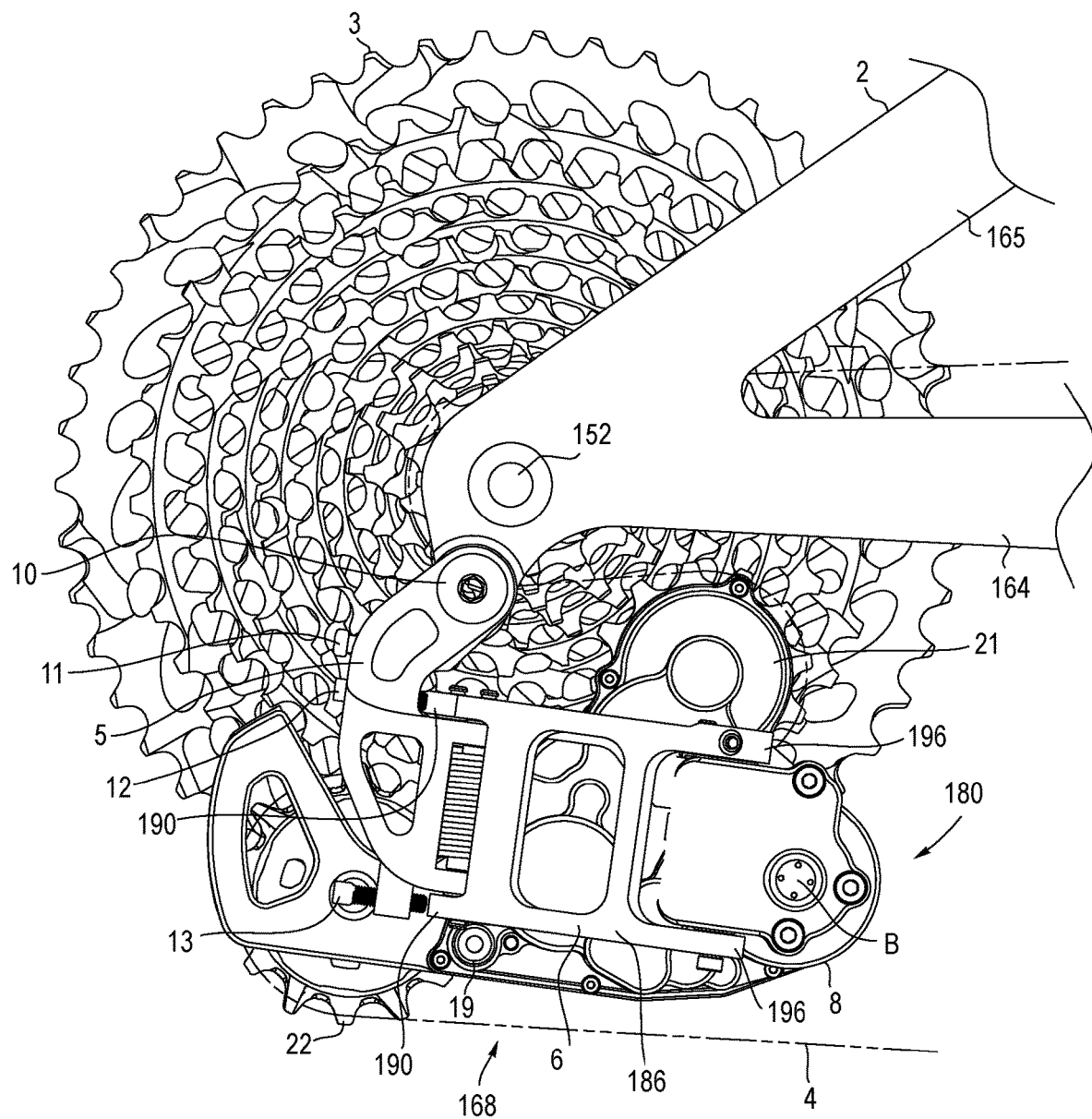
FIG. 1 is a partial side view of a bicycle assembled with a rear derailleur having a cage assembly in a fully rotated clockwise position.

Operation:

Referring to FIGS. 1, 2, and 4, when the rider pedals the bicycle, the chain 4 drives the cassette 3 clockwise, referring to FIG. 1, and causes the rear wheel to rotate. Because the chain 4 is also engaged with upper chain pulley 21, the upper chain pulley 21 is driven counterclockwise, referring to FIG. 1. Referring to FIGS. 10-13, rotation of upper chain pulley 21 causes the pulley shaft 35 to rotate. The first generator spur gear 37, which is non-rotationally fixed to the pulley shaft 35, is therefore also rotated. Referring to FIG. 13, the transmission 250 provides for rotational power to flow from the first generator spur gear 37 to the first generator pinion gear 38 to the second generator spur gear 39 to the second generator pinion gear 40 to the first generator pulley 41 through the belt 43 to the second generator pulley 42 to the rotor 47 of the generator 50. Rotation of the rotor 47 relative to the stator 48 generates electrical power. Referring to FIGS. 15 and 16, the generated electrical power flows through the wires 49 of the generator 50 to the generator PCB 55, and thereafter through the pogo pins 57a into the main PCB 57, where it is stored in an storage device 57d, for example the supercapacitors or a battery. The storage device may thereafter supply power to the motor 60 to effect various shifting actions. It should be understood that the storage device 57d may supply power to other electrical devices and accessories, including those located remote to the derailleur, for example and without limitation a wheel speed sensor, a cassette speed sensor, a power meter, lights, the front derailleur, an adjustable seat post, and/or other types of bicycle accessories, or may supply power to the motor and to such auxiliary devices. In embodiments where the electrical devices and accessories are located remote to the storage device, power may be transmitted by various electrical connectors, e.g., wires. In other embodiments, the energy storage device also may be located remote to the derailleur, for example with the energy storage device mounted on another part of the frame 2 or bicycle component, and joined to the generator with electrical connectors, e.g., wires.

It should be noted that the interface of the pulleys 41, 42 and the belt 43 results in less noise than an equivalent spur and pinion gear interface. Typically, gears that rotate relatively slowly do not create as much noise that may be objectionable to the rider, whereas gears that rotate at a high revolution per minute (RPM) may create a high-pitched noise that may be objectionable to the rider. Therefore, in one embodiment, the transmission may use gear interfaces when the angular velocities are relatively low, (i.e. close to the angular velocity of the upper pulley 21), and a pulley belt interface may be used when the angular velocity of the pulleys are relatively high (i.e. close to the angular velocity of the rotor 47).

In order to request a gear shift, the rider operates a switch of a shifter on the handlebar. A wireless signal may be emitted from the shifter. The wireless signal is received by the antenna and radio on the main PCB 57. The signal is processed by the main PCB 57, and a controller provides for power to be transmitted from the power storage device 57d, e.g., the supercapacitors, to the motor 60. Referring to FIGS. 17 and 19, mechanical power from the motor 60, or a shifting drive system input, is transmitted from the first drive pinion 65 to the first drive spur 66 to the second drive pinion 67 to the second drive spur 68 to the third drive pinion to the third drive spur 70 to the lead screw 81, or output.

In the case that the rider requests a shift to a larger sprocket or cog of the cassette 3, power supply provides power to the motor 60, which rotates in the direction that, through the shifting drive system, including the drive pinion gears and spur gears 65-70, drives the third drive spur gear 70 and the lead screw 81 in a first rotational direction. The lead nut 91 is threadably engaged with the lead screw, but the lead nut 91 is unable to rotate relative to the cage shaft 85. Accordingly, the lead nut 91 moves axially along the axis (B) in the upwards direction, with reference to the orientation of FIG. 20. The spherical end 91b of the lead nut 91 drives the crank arm 92 counterclockwise around the axis (C) of the fourth pin 18. Referring to FIGS. 28 and 29, the drive pin 97 engages the surface 99b of the drive element 99, thereby rotating the drive element 99 counterclockwise around the axis (C) of the fourth pin 18. Since the drive element 99 is fixed to the fourth pin 18, the fourth pin 18 also rotates counterclockwise. Since the fourth pin 18 also is fixed to the outer link 6, the outer link 6 also rotates counterclockwise around the axis (C), driving the linkage 186 in the inboard direction of the bicycle, which drives the moveable member 8 and the cage assembly 9 in the inboard direction. Since the chain 4 is engaged with upper chain pulley 21 of the cage assembly 9, the chain 4 also is driven in the inboard direction, causing the chain 4 to shift to the next larger sprocket or cog of the cassette 3.

In the case that the rider requests a shift to a smaller sprocket or cog of the cassette 3, the power supply supplies power to the motor 60, which rotates in the direction that, through the shifting drive system, including the drive pinion gears and spur gears 65-70, drives the third drive spur gear 70 and the lead screw 81 in a second rotational direction, driving lead nut 91 to move axially along axis (B) in the downwards direction. The spherical end 91b of the lead nut 91 drives the crank arm 92 clockwise in FIG. 21 around the axis (C) of the fourth pin 18. The crank arm 92 drives the saver spring 95 clockwise around axis (C) of the fourth pin 18. The saver spring 95 drives the drive element 99 clockwise around axis (C) of the fourth pin 18. Since the drive element 99 is fixed to the fourth pin 18, the fourth pin 18 also rotates clockwise. Since the fourth pin 18 is fixed to the outer link 6, the outer link 6 also rotates clockwise around axis (C), driving the parallelogram linkage 186 in the outboard direction of the bicycle, which drives the moveable member 8 and the cage assembly 9 in the outboard direction. Since the chain 4 is engaged with upper chain pulley 21 of the cage assembly 9, the chain 4 is also driven in the outboard direction, causing the chain 4 to shift into the next smaller sprocket or cog of the cassette 3.

Referring to FIGS. 16, 17, and 19, the encoder 57e on the main PCB 57, together with encoder magnet (72), are used to provide positional feedback of the moveable member 8, the cage assembly 9 and the chain pulley 21. The encoder gear 71 is engaged with first drive spur gear 66. As first drive spur gear 66 rotates, the gear 66 causes the encoder gear 71, along with encoder magnet 72 to rotate about the axis of encoder gear 71. Thus, the encoder magnet 72 rotates relative to the encoder 57e. The encoder 57e outputs a signal that indicates the angular position of encoder magnet 72 relative to the encoder 57e. During a shifting operation, the encoder magnet 72 makes multiple complete revolutions. A controller on the main PCB 57 counts the number of times that encoder magnet 72 makes a complete revolution. Knowing the number of times that encoder magnet 72 has rotated, along with its current angular position relative to encoder 57e, the controller can calculate the current position of the moveable member 8 relative to the bicycle frame 2, and by extension the cassette 3. A pre-determined shift table has multiple values, each of which corresponds to a shift position of derailleur 180. As the encoder magnet 72 rotates during a shifting operation, a value corresponding to the current position of the moveable member 8 is compared to a target value in the table, with the controller capable or operable to determine when the moveable member 8 has reached its target position (i.e. the gear selected by the rider).

In order for the system to establish a known relationship between the values of angular position output by the encoder 57e and the physical location of the moveable member 8, a homing routine may be performed. In this routine, the derailleur 180 positions the crank arm 92 at a reference position, and sets the corresponding angular position indicated by encoder 57e as a reference value. Referring to FIG. 20, the lead nut 91 is driven downwards, driving the crank arm 92 clockwise around axis (C) until contact between the crank arm 92 and a moveable member cover 93 prevents further clockwise rotation of the crank arm 92. This is the reference position, which represents the farthest outboard position to which the derailleur can move. The corresponding positional value output by the encoder 57e is established as a reference value. In one embodiment, this homing routine is performed at the factory when the derailleur 180 is assembled, but the routine may also be performed after derailleur 180 is installed on a bicycle. The homing routine may be performed even when the moveable member 8 is physically prevented from moving (i.e. when the rider isn't pedaling and the presence of the chain 4 prevents movement of the moveable member 8). For example, in the event that the moveable member 8 is physically prevented from moving, the outer link 6, fourth pin 18 and drive element 99 will also be prevented from moving. However, the crank arm 92 can still rotate clockwise to the position shown in FIG. 20 by winding up the saver spring 95. Thus, the crank arm 92 may be driven to its reference position and the homing operation can be performed, even if movement of the moveable member 8 is blocked.

The saver spring 95, along with its associated parts, also acts as a safety clutch during impacts. In the event that the moveable member 8 or outer link 6 is acted upon by an external force that pushes the moveable member 8 in the inboard direction, the drive element 99 will be driven in the counterclockwise direction around axis (C). If the external force exceeds the preload of the saver spring 95, the drive element 99 will wind up the saver spring 95, preventing excessive force from being transmitted to the lead nut 91. When the external force is removed, the saver spring 95 will unwind to its previous position.

Figure 34:
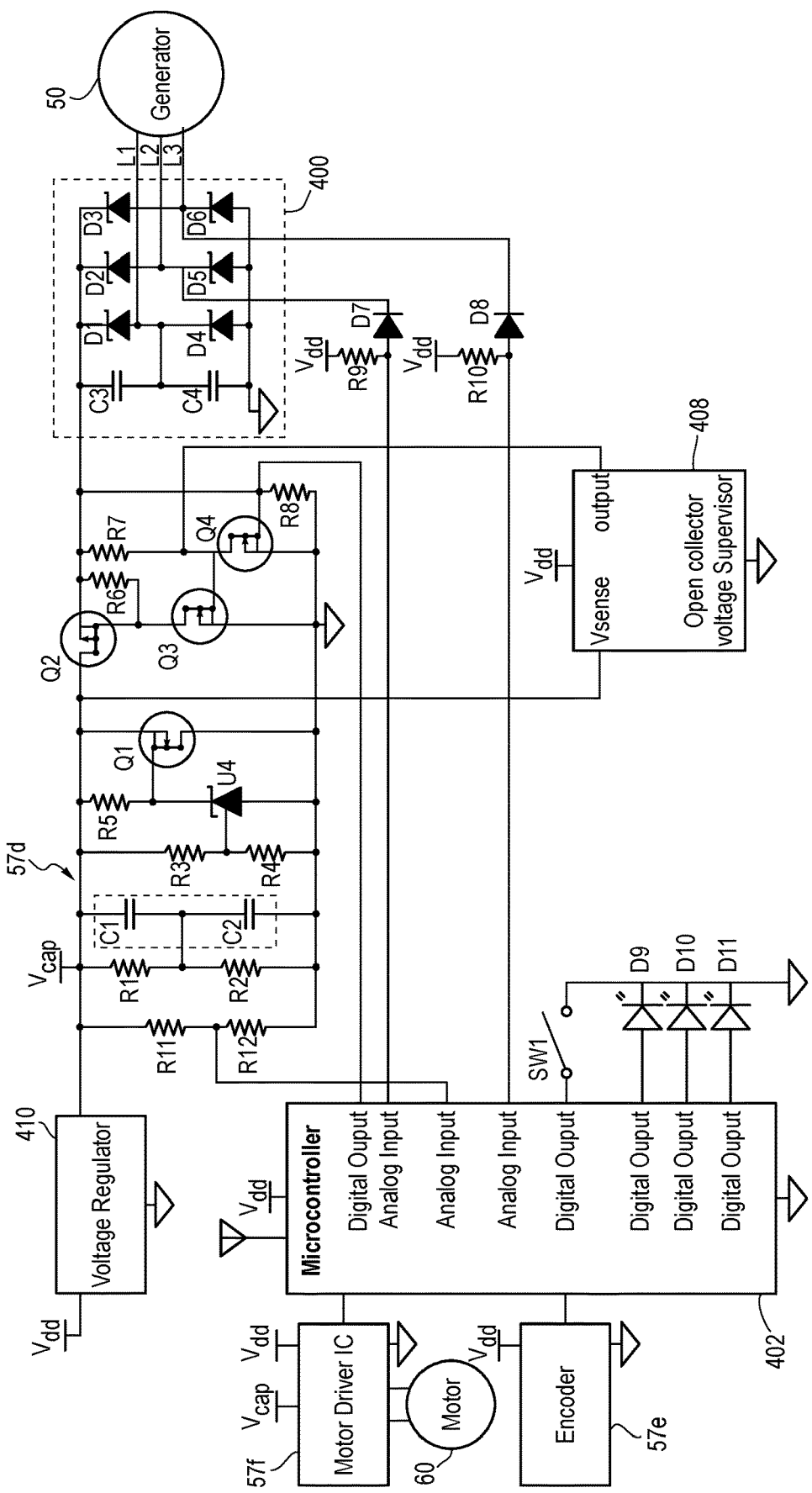
FIG. 34 is a schematic illustrating the generator and motor control system.

Control System and Generator Input/Rectification:

Referring to FIG. 34, a schematic shows one embodiment of a control system for the generator 50, motor 60 and shifting drive system 330. As noted above, the chain pulley 21 rotates the generator 50 which creates an alternating current (AC) voltage across each set of coils within the generator 50. The coils are connected to a rectification circuit 400 formed by diodes D1, D2, D3, D4, D5 and D6, which rectify the voltage to direct current (DC). The generator 50 may be configured as a permanent magnet brushless type generator having a plurality of (e.g., three) sets of coils internally connected preferably in a star configuration, although a delta configuration may also be suitable. The generator 50 may also be constructed from any number of coils so long as the coils are connected to the rectification circuit 400 that creates a DC voltage. The generator 50 may also be of a brushed type which creates DC voltage mechanically. Capacitors C3 and C4 are incorporated into the circuit to create a better impedance match to the energy storage device 57d, e.g., storage capacitors C1 and C2.

Figure 35A:
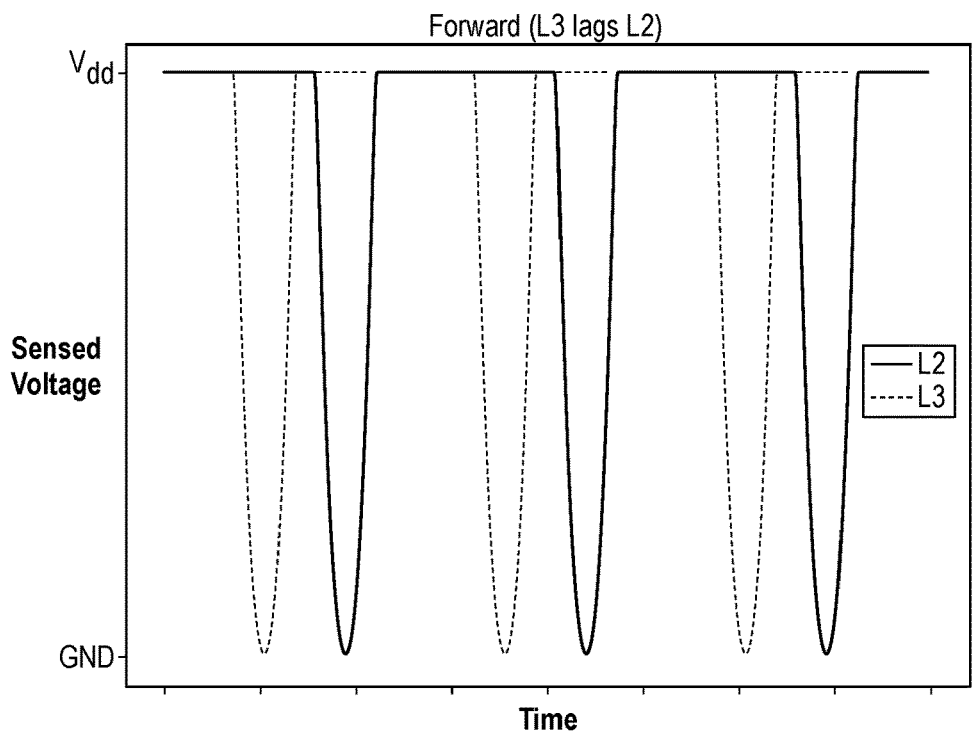
FIGS. 35A and B are graphs showing respectively forward and reverse pedaling generator phase detection sequences.
Figure 35B:
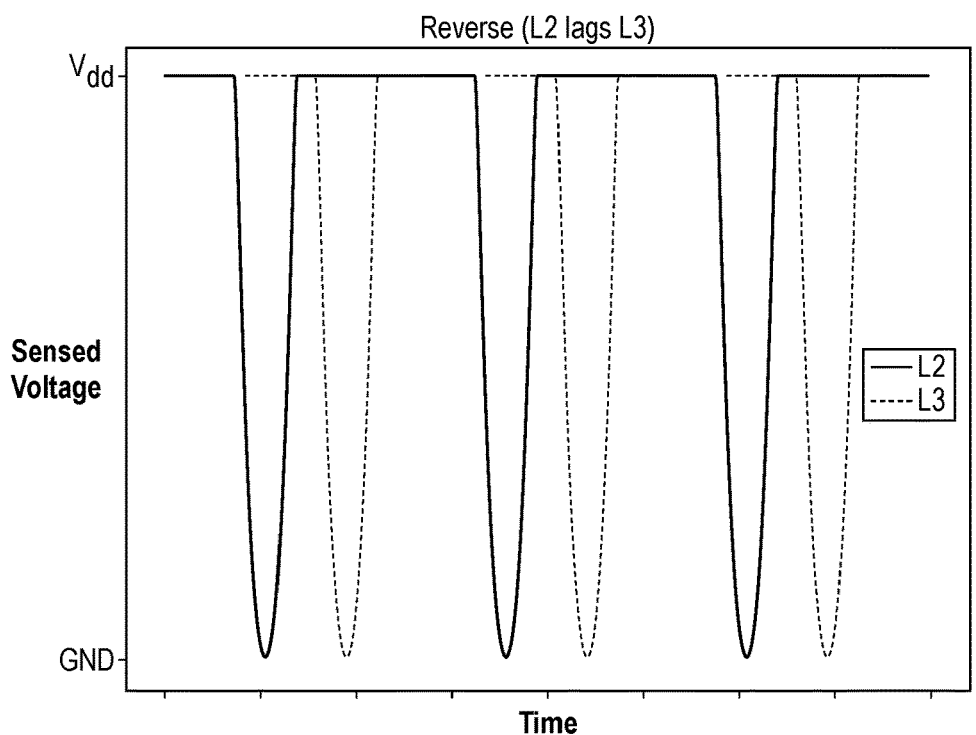

Phase Sensing:

Diodes D7, D8 and resistors R9, R10 are used to sense the speed and direction of the generator 50 which may be used to determine the speed and rotational direction of the chain pulley 21 and therefore the speed and rotational direction of the chain 4. A memory contains information about the number of teeth of each sprocket or cog of the cassette 3. As explained above, the encoder 57e provide a signal such that the controller, e.g., microcontroller 402, knows what gear is currently indexed. The microcontroller 402 is programmed with information about the number of teeth on chainring(s). If the bicycle has more than one chainring installed, the front chainring shifting system communicates the currently selected chainring to the rear derailleur 180 when the front chain ring is changed. With all this information, the controller 402 on the rear derailleur 180 knows how fast the bicycle is travelling and how fast the rider is turning the cranks. The bicycle speed and cadence information may be used to perform an automatic shifting algorithm which keeps the gear ratio at a preferable ratio for the rider. The diode anode of each diode-resistor pair is connected to a signal input on the microcontroller 402 as well as to the digital voltage supply Vdd through a pull up resistor. When the individual phase voltages of the diodes D7 or D8 drop below the VDD, the diode will conduct to ground and register a low signal to the microcontroller 402. When the phase voltage exceeds VDD the diode will not conduct and the signal to the microcontroller 402 will be clamped to VDD through R9 or R10. The sequence of pulses from each phase are different if the generator 50 is spinning clockwise or counter clockwise, as shown in FIGS. 35A and B, and any change in frequency is based on how fast the generator 50 is turning and therefore how fast the rider is pedaling. These sequences can be recognized by timing order by the microcontroller 402. The microcontroller 402 may modify the charging behavior if the pulse train corresponds to forward or reverse pedaling, for instance it may be desirable to disable charging, or deactivate the generator, while backpedaling, for example with the clutch, to reduce slack in the chain 4, which may cause the chain to disengage from the sprockets. It may be desirable to only allow charging above a certain rider cadence, and/or it may be desirable to always have charging enabled while not pedaling to reduce chain slap, etc. One way to determine rotational direction is to look at the pulses read by the microcontroller 402 for two adjacent generator coils. The phase of the L2 and L3 signals are separated by 120 degrees (of time) followed by 240 degrees and the sequence repeats when the generator 50 is spinning at a constant speed. The order of pulses indicates direction. For instance, an L2 signal followed by 120 degrees, then an L3 signal followed by 240 degrees and another L2 signal might indicate forward pedaling (FIG. 35A), where an L3 signal followed by 120 degrees then an L2 signal followed by 240 degrees followed by another L3 signal would indicate reverse pedaling (FIG. 35B). The actual generator speed is not likely to be perfectly constant in reality, but, because the generator 50 rotates many times for each turn of the cranks, analyzing the relative spacing of the L2, L3 sequence will be valid.

Charge Control:

Referring to FIG. 34, a P-channel mosfet Q2 connects and disconnects the rectified voltage from the generator 50 to the storage device 57d (e.g., capacitors C1 and C2) for charging. Resistors R6, R7, R8 and n-channel mosfets Q3 and Q4 allow the microcontroller 402 to control the Q2 on/off state with a digital output while also setting Q2 to a state by default if the voltage on C1, C2 is too low to power the microcontroller 402. Microcontroller 402 senses the state of charge of the capacitors (C1, C2) as a voltage through a voltage divider formed by R11 and R12. The microcontroller 402 turns Q2 off when maximum capacitor state of charge is reached and turns on Q2 when capacitor state of charge falls below some threshold. The microcontroller 402 may switch Q2 on and off rapidly with pulse width modulation or another variable duty cycle modulation scheme in order to regulate the effective rate of charge to reduce torque at the chain pulley. A proportional control of the Q2 switching modulation may be implemented by the microcontroller such that a low state of charge of the storage capacitors (C1, C2) would cause Q2 to be on at or nearly 100 percent charge rate but a state of charge close to maximum capacitor change may be at a very low charge rate. Modulation of the charge signal allows smooth transitions between not charging to charging, thereby preventing the user from feeling abrupt torque changes. As a redundancy to the microcontroller 402 turning off Q2 at full charge a voltage sensing integrated circuit (IC) 408 may also disable Q2 if the capacitor state of charge exceeds some threshold voltage. The threshold voltage that the voltage supervisor disables Q2 is preferably higher than the voltage the microcontroller 402 would stop charging at by some small margin. If either the IC or the microcontroller 402 signals for charging to be disabled, Q2 will turn off regardless of state of other control signal. Redundant charge control is useful for situations where the microcontroller 402 is unable to perform charge control function, for instance during a firmware update of the microcontroller. An additional redundant overvoltage protection of the capacitors is optionally provided by an integrated circuit (IC) U4, which may be of type LM317 shunt regulator. This IC senses capacitor voltage and turns on Q1 shorting the capacitors to ground if a safe voltage threshold is exceeded, which will discharge capacitors until capacitor voltage is below safe threshold. Capacitors (C1, C2) are preferably of electrochemical double-layer (ELDC) type also known as super capacitors. The schematic shows two capacitors (C1, C2) in series but any number of series capacitors may be used. The number of capacitors in series should be matched to the preferred operating voltage of the motor 60 and open circuit voltage of the generator 50. The capacitors 57*d* may also be arranged in a multiple parallel-series arrangement to achieve different voltage and capacitance values. The capacitors (C1, C2) may be of other types such as ceramic, electrolytic, tantalum or a future capacitor technology. The capacitors (C1, C2) function may also be performed by a rechargeable battery such as a lithium ion battery or lithium polymer battery or some future battery technology. Resistors R1 and R2 function to balance the charge between the two capacitors over time so that one capacitor does not develop an excess of charge compared to the other capacitor.

Wrapping Encoder:

In one embodiment of the derailleur 180, configured with the linkage 186 actuated by lead screw 81, the encoder 57*e* may be required to count multiple turns of sensing element (such as a diametrically magnetized magnet). This turn counting can be performed by the encoder 57*e* or by the microcontroller 402 noting when the encoder wraps over its max value. The absolute position of the linkage 186 is determined by moving the derailleur to one end of possible travel and detecting a stall condition on the motor 60. Ideally this motion limit detection is performed only once during manufacturing, therefore the encoder system must store the number of full rotational wraps between power cycles of the device. In one embodiment, the derailleur 180 has the characteristic of having a non-removable power supply 57*d* (capacitors (C1, C2)), meaning the power source cannot be suddenly disconnected.

Figure 36:
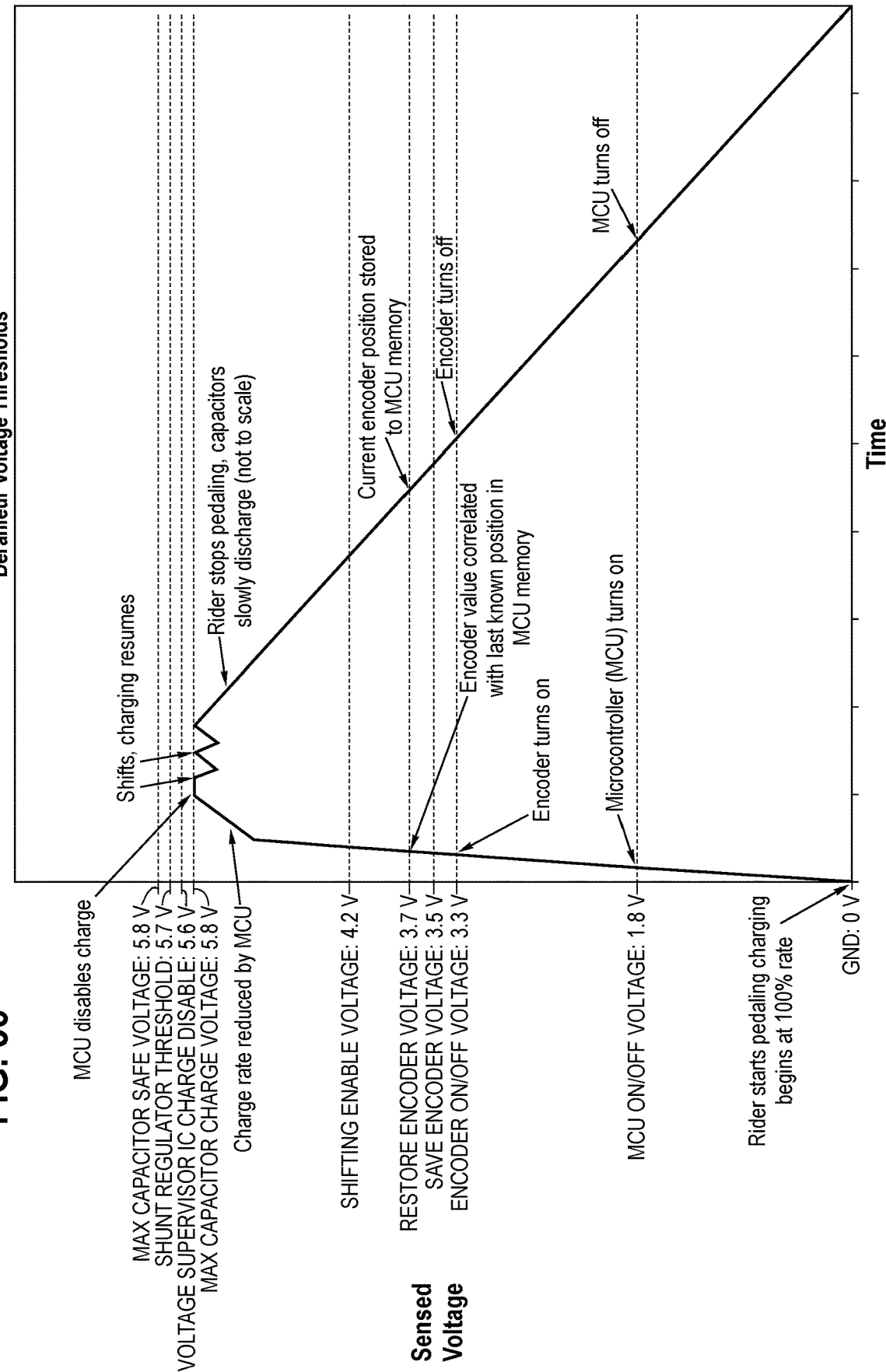
FIG. 36 is a graph showing Sensed Voltage v. Time for a sequence of pedaling.

Referring to FIG. 36, when the bicycle is not being ridden, the capacitor voltage may slowly fall due to internal leakage, the balancing resistors and the small power requirements of the microcontroller 402, and may drop to 0. When the voltage of the capacitor 57*d* approaches a threshold voltage (e.g., 3.5V), or a voltage slightly above the minimum voltage required to power the encoder 57*e*, (e.g., 3.3V), the microcontroller 402 may save the current wrap count to the memory. As shown in FIG. 36, when the voltage of the capacitors 57*d* starts increasing again due to the bike being pedaled, the microcontroller will turn on when the voltage reaches a first threshold voltage (e.g., 1.8V), the encoder will turn on when the voltage reaches a second threshold voltage 3.3V), and at some voltage threshold (e.g., 3.7V), higher than the voltage at which the derailleur saved the last wrap count, but lower than a threshold voltage (e.g., 4.2V) at which the microcontroller 402 allows shifting to occur, the microcontroller 402 will read the current encoder position and add the last known wrap count to restore a knowledge of the absolute position of the derailleur. Above the shifting threshold voltage (e.g., 4.2V), shifting may occur.

Referring to FIG. 34, a voltage regulator 410 may be included to provide a voltage source lower than the voltage of the capacitor 57*d* to supply the microcontroller 402, encoder 57*e*, motor controller and other ICs in the circuit. The voltage regulator 410 may be integral to the microcontroller 402, or one of the other ICs, which in turn supplies a lower voltage to other components in the circuit. The voltage regulator 410 is preferably a switching buck type, but may also be a linear type or buck boost type. The voltage regulator 410 may be omitted if the capacitor voltage does not exceed the maximum ratings for the microcontroller or other ICs.

A switch SW1 is connected to a digital input of the microcontroller 402 to provide user input to system such as wireless pairing function. More or fewer switches may be used for various user input.

Optional LEDs D9, D10 and D11 may be provided to indicate to the user about the derailleur 180 such as pairing state or state of capacitor charge. These may be omitted. The LEDs may be configured to illuminate in various colors.

Motor driver 57*f* is operatively connected to the microcontroller 402 by an appropriate control signal or set of control signals such as an analog control signal, a digital control signal such as I2C, SPI, UART, etc., or may be control by pulse width modulated digital signals.

The microcontroller 402 may include a general processor, digital signal processor, an application specific integrated circuit (ASIC), field programmable gate array (FPGA), analog circuit, digital circuit, combinations thereof, or other now known or later developed processor. The processor may be a single device or combinations of devices, such as through shared or parallel processing.

The memory may be a volatile memory or a non-volatile memory. The memory may include one or more of a read only memory (ROM), random access memory (RAM), a flash memory, an electronic erasable program read only memory (EEPROM), or other type of memory. The memory may be removable from the derailleur 180, such as a secure digital (SD) memory card. In a particular non-limiting, exemplary embodiment, a computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

The memory may be a non-transitory computer-readable medium and may be described as a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

A communication interface provides for data and/or signal communication from and between the derailleur to another component of the bicycle, or an external device such as a mobile phone or other computing device. The communication interface communicates the data using any operable connection. An operable connection may be one in which signals, physical communications, and/or logical communications may be sent and/or received. An operable connection may include a physical interface, an electrical interface, and/or a data interface. The communication interface may be configured to communicate wirelessly, and as such include one or more antennae. The communication interface provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Bluetooth® and or ANT+™ standards may also, or alternatively, be used. Accordingly, replacement standards and protocols having the same or similar functions as those disclosed herein are considered equivalents thereof.

The communication interface is configured to send and/or receive data such as control signals and/or commands to and/or from bicycle components such as the front gear changer and/or the derailleurs 180. The component communication interface communicates the data using any operable connection. An operable connection may be one in which signals, physical communications, and/or logical communications may be sent and/or received. An operable connection may include a physical interface, an electrical interface, and/or a data interface. The communication interface provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In accordance with various embodiments of the present disclosure, methods described herein may be implemented with software programs executable by a computer system, such as the microcontroller and circuitry. Further, in an exemplary, non-limited embodiment, implementations can include distributed processing, component/object distributed processing, and parallel processing. Alternatively, virtual computer system processing can be constructed to implement one or more of the methods or functionality as described herein.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware, as well as other electronic components. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, or a power meter system to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

Although embodiments have been described for illustrative purposes, those skilled in the art will appreciate that various modifications, additions, and substitutions are possible, without departing from the scope and spirit of the disclosure. It is therefore intended that the foregoing description be regarded as illustrative rather than limiting, and that it be understood that all equivalents and/or combinations of embodiments and examples are intended to be included in this description.

Although certain parts, components, features, and methods of operation and use have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A bicycle derailleur comprising:
   a base member mountable to a bicycle frame;
   a moveable member moveably coupled to the base member, wherein the moveable member is moveable in opposite first and second directions relative to the base member;
   a cage assembly attached to the moveable member, the cage assembly rotatable in a rotation direction relative to the moveable member; and
   a motor coupled to and moveable with the cage assembly in the first direction, the second direction, and the rotation direction, and wherein the motor is operable to move the cage assembly in the opposite first and second directions.

2. The bicycle derailleur of claim 1 wherein the moveable member is moveably coupled to the base member with a linkage, and wherein the cage assembly is rotatably coupled to the moveable member.

3. The bicycle derailleur of claim 2 wherein the linkage comprises first and second links extending between the base member and the moveable member, wherein the base member, the first and second links and the moveable member define a four-bar linkage.

4. The bicycle derailleur of claim 2 wherein the cage assembly is rotatably coupled to the moveable member about a laterally extending axis.

5. The bicycle derailleur of claim 2 further comprising a shifting drive system coupled between the motor and the linkage, wherein the shifting drive system comprises an input from the motor and an output coupled to the linkage.

6. The bicycle derailleur of claim 5 wherein the output comprises a lead screw rotatable in first and second opposite rotation directions, wherein the lead screw is threadably engaged with a crank arm, wherein the crank arm is moveable in opposite first and second axial directions in response to the rotation of the lead screw in the opposite first and second rotation directions, and wherein the crank arm is coupled to the linkage.

7. The bicycle derailleur of claim 5 wherein the input has a first rotational speed, and wherein the output has a second rotational speed, wherein the first rotational speed is greater than the second rotational speed.

8. A bicycle derailleur comprising:
   a base member mountable to a bicycle frame;
   a cage assembly moveably coupled to the base member, wherein the cage assembly is moveable in opposite first and second directions relative to the base member;
   a motor coupled to and moveable with the cage assembly in the opposite first and second directions, and wherein the motor is operable to move the cage assembly in the opposite first and second directions; and
   an electrical generator system coupled to and moveable with the cage assembly, wherein the electrical generator system supplies power to the motor.

9. The bicycle derailleur of claim 8 wherein the electrical generator system comprises a generator and an energy storage device, wherein the generator generates energy stored in the energy storage device, and wherein the motor is electrically coupled to, and powered by, the energy storage device.

10. The bicycle derailleur of claim 9 wherein the energy storage device comprises at least one capacitor.

11. The bicycle derailleur of claim 9 wherein the cage assembly comprises a housing, and wherein the electrical generator system comprises a generator drive system coupled to the generator, wherein the generator drive system comprises a chain pulley rotatably coupled to the housing about a first rotation axis.

12. The bicycle derailleur of claim 11 wherein the generator drive system comprises a generator transmission operably coupled between the chain pulley and the generator.

13. The bicycle derailleur of claim 12 wherein the chain pulley has a first rotational speed and the generator has a second rotation speed, wherein the generator transmission provides a ratio between the first and second rotation speeds of between and including 20:1 and 50:1.

14. The bicycle derailleur of claim 12 wherein the generator transmission comprises at least first and second pulleys rotatably coupled to the housing about second and third rotation axes respectively, and a belt engaged with the first and second pulleys, wherein the first and second pulleys have a pulley ratio greater than 1.

15. The bicycle derailleur of claim 14 further comprising a belt tensioner coupled to the housing and operable to adjust a tension of the belt.

16. The bicycle derailleur of claim 14 wherein the generator transmission further comprises a first spur gear fixed to and rotatable with the chain pulley about the first rotation axis, a first pinion gear engaged by the first spur gear and rotatable about a fourth rotation axis spaced from the first rotation axis, a second spur gear fixed to and rotatable with the first pinion gear about the fourth rotation axis, and a second pinion gear engaged by the second spur gear and rotatable about the second rotation axis spaced from the fourth rotation axis, wherein the first pulley is fixed to and rotatable with the second pinion gear about the fourth rotation axis, and wherein the generator comprises a rotor fixed to the second pulley and rotatable with the second pulley about the third rotation axis.

17. The bicycle derailleur of claim 12 wherein the generator transmission comprises a drive member defining a second rotation axis and a gear comprising a clutch coaxially mounted with the drive member, wherein the clutch provides for one-way rotational engagement between the drive member and the gear, wherein the gear is rotatable with the drive member in a first rotation direction of the drive member, and wherein the drive member is rotatable relative to the gear in a second rotation direction of the drive member opposite the first rotation direction.

* * * * *